(12) United States Patent
Gautam et al.

(10) Patent No.: US 9,617,381 B2
(45) Date of Patent: *Apr. 11, 2017

(54) LOW SHEAR PROCESS FOR POLYCARBONATE PURIFICATION

(71) Applicant: SABIC Global Technologies B.V., Bergen op Zoom (NL)

(72) Inventors: Pankaj Singh Gautam, Evansville, IN (US); Zeljko Kuzeljevic, Evansville, IN (US); William E. Hollar, Jr., Mount Vernon, IN (US); Mohan Khadilkar, Mount Vernon, IN (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/907,349

(22) PCT Filed: Jul. 25, 2014

(86) PCT No.: PCT/US2014/048251
§ 371 (c)(1),
(2) Date: Jan. 25, 2016

(87) PCT Pub. No.: WO2015/013648
PCT Pub. Date: Jan. 29, 2015

(65) Prior Publication Data
US 2016/0168322 A1   Jun. 16, 2016

Related U.S. Application Data

(60) Provisional application No. 61/858,233, filed on Jul. 25, 2013, provisional application No. 61/858,250, filed on Jul. 25, 2013, provisional application No. 61/858,293, filed on Jul. 25, 2013.

(51) Int. Cl.
| | | |
|---|---|---|
| *C08G 64/00* | (2006.01) | |
| *C08G 64/40* | (2006.01) | |
| *C08G 64/24* | (2006.01) | |
| *C08G 63/02* | (2006.01) | |

(52) U.S. Cl.
CPC ........... *C08G 64/406* (2013.01); *C08G 64/24* (2013.01)

(58) Field of Classification Search
CPC .................................... C08G 64/403

USPC ........................... 528/196, 198, 502
See application file for complete search history.

(56) References Cited

U.S. PATENT DOCUMENTS

| | | | |
|---|---|---|---|
| 3,666,719 A | 5/1972 | Morgenstern et al. | |
| 4,154,775 A | 5/1979 | Axelrod | |
| 4,191,685 A | 3/1980 | Haaf et al. | |
| 4,316,009 A | 2/1982 | Rinaldi et al. | |
| 4,692,490 A | 9/1987 | Abolins | |
| 6,420,517 B1 | 7/2002 | Van Gool et al. | |
| 6,458,920 B1 | 10/2002 | Baxendell et al. | |
| 7,517,944 B2 | 4/2009 | Kunishi et al. | |
| 2016/0168323 A1* | 6/2016 | Hollar, Jr. ............ | C08G 64/406 528/201 |
| 2016/0177029 A1 | 6/2016 | Hollar, Jr. et al. | |

FOREIGN PATENT DOCUMENTS

| | | |
|---|---|---|
| CN | 102775595 A | 11/2012 |
| EP | 1020483 A2 | 7/2000 |
| GB | 2043083 A | 10/1980 |
| WO | 0224784 A1 | 3/2002 |

OTHER PUBLICATIONS

International Search Report for International Application No. PCT/US2014/048251; International filing date: Jul. 25, 2014; Date of Mailing Nov. 28, 2014; 4 pages.
Written Opinion for International Application No. PCT/US2014/048251; International Filing Date: Jul. 25, 201;, Date of Mailing Nov. 28, 2014; 6 pages.
Cheng et al.; "Improvement of washing and separation process for polycarbonate"; Cheng Reference_MT_ENG;现代 化工. vol. 33, No. 2; 2013; 7 pages.

* cited by examiner

*Primary Examiner* — Terressa Boykin
(74) *Attorney, Agent, or Firm* — Cantor Colburn LLP

(57) ABSTRACT

In another embodiment, a process of purifying an interfacially polymerized polycarbonate from a feed comprising an aqueous phase and an organic phase comprising an organic solvent, the interfacially polymerized polycarbonate, a catalyst, and ions, can comprise: separating the aqueous phase and the organic phase from the feed, wherein during the separating the feed is subjected to at least one of: energy of less than or equal to 0.5 kJ/kg of feed, a shear rate of less than 150,000 $S^{-1}$, and centrifugal forces of 100 to 2,000 g-force; to form a purified aqueous phase and a purified organic phase comprising a purified polycarbonate.

20 Claims, 9 Drawing Sheets

0
LOW SHEAR PROCESS FOR POLYCARBONATE PURIFICATION

CROSS REFERENCE TO RELATED APPLICATIONS

This application is a National Stage application of PCT/US2014/048251, filed Jul. 25, 2014, which claims the benefit of U.S. Provisional Application Nos. 61/858,233, filed Jul. 25, 2013; 61/858,250, filed Jul. 25, 2013; 61/858,293, filed Jul. 25, 2013; all of which are incorporated by reference in their entirety herein.

BACKGROUND

Interfacial processes for the polymerization of polycarbonate yield a mixture comprising an aqueous phase and an organic phase. The aqueous phase, also referred to as the brine phase, comprises salts, ionic species, and interfacial catalyst. The organic phase, also referred to as the resin phase or polymer phase, comprises solvent, dissolved polycarbonate, and interfacial catalyst. Some salts and ionic species can further be present in the organic phase as a result of brine entrainment from the aqueous phase. These salts and ionic species (referred to herein as "ions" for convenience), as well as any interfacial catalyst are generally removed from the organic phase in a purification process because they affect the final product quality. Such a purification process generally involves separation of the aqueous phase from the organic phase followed by the removal of ions and catalyst in one or more extraction steps from the organic phase to result in a purified polycarbonate.

A problem in polycarbonate purification processes is that the organic phase and the aqueous phase can form an emulsion during manufacture or purification. Emulsification is characterized by the creation of small, difficult-to-remove droplets of a first phase dispersed within a second phase. Accordingly, emulsification can result in one or both of 1) only a partial separation of the organic phase and aqueous phase such that part of the organic phase is carried over and remains with the aqueous phase and 2) an insufficient removal of impurities (such as ions and catalyst) from the organic phase. As a result, stable plant operation can be difficult to maintain and ultimately the quantity and the quality of the purified polycarbonate can be reduced.

A further problem that can arise in a polycarbonate manufacturing facility is the treatment of certain organic interfacial polycarbonate waste streams, also called "off-grade solvent." These waste streams are generated in the interfacial polycarbonate manufacturing process through hood flushes to disc centrifuges, for example, and a variety of flushes to the equipment in various unit operations using an organic solvent. They will accordingly be referred to herein as "interfacial polycarbonate organic wash streams," or "organic wash streams" for convenience. The interfacial organic polycarbonate wash stream contains low levels of dissolved solids that are often degraded polycarbonates, catalysts, and ions. Accordingly, without any treatment or without sufficient purification, recycle of the wash stream back to the reactor may adversely impact product properties such as color and melt stability. While, the wash stream can be purified by an aqueous wash, emulsification can be an issue affecting the efficiency of the treatment. In addition, the emulsified organic phase carryover, which is known as "cream," can make its way to the wastewater treatment system and block the system, disrupting the entire process.

One or both of a purification process that can reduce or eliminate emulsion formation in interfacial polycarbonate manufacture and polymerization and that can reduce or eliminate emulsions in the purification of organic polycarbonate waste stream is therefore desirable.

BRIEF DESCRIPTION

Disclosed herein is a process of purifying a polycarbonate from an interfacial polymerization product mixture In an embodiment, a process of making a purified polycarbonate can comprise: interfacially polymerizing a polycarbonate to form a product mixture; wherein the product mixture comprises an aqueous phase and an organic phase comprising an organic solvent, the polycarbonate, a catalyst, and ions; separating the aqueous phase and the organic phase while subjecting the product mixture to a shear rate of less than 150,000 $S^{-1}$ to form a separated organic phase and a separated aqueous phase; extracting the catalyst from the separated organic phase with an acid stream while subjecting the separated organic phase and the acid stream to a shear rate of less than less than 150,000 $S^{-1}$; and extracting the ions from the separated organic phase with a water stream while subjecting the separated organic phase and the water stream to a shear rate of less than less than 150,000 $S^{-1}$; forming a purified organic phase comprising the purified polycarbonate.

In another embodiment, a process of making a purified polycarbonate can comprise: interfacially polymerizing a polycarbonate to form a product mixture; wherein the product mixture comprises an aqueous phase and an organic phase comprising an organic solvent, the polycarbonate, a catalyst, and ions; separating the aqueous phase and the organic phase from the product mixture, wherein during the separating the product mixture is subjected to at least one of: an energy of less than or equal to 0.5 kJ/kg of product mixture, a shear rate of less than 150,000 $S^{-1}$, and centrifugal forces of 100 to 2,000 g-force; forming a purified aqueous phase and a purified organic phase comprising the purified polycarbonate.

In an embodiment, a process of purifying a polycarbonate from a feed comprising an interfacial polymerization product mixture, wherein the product mixture comprises an aqueous phase and an organic phase comprising an organic solvent, the polycarbonate, a catalyst, and ions, can comprise: separating the aqueous phase and the organic phase while subjecting the product mixture to a shear rate of less than 150,000 $S^{-1}$ to form a separated organic phase and a separated aqueous phase; extracting the catalyst from the separated organic phase with an acid stream while subjecting the separated organic phase and the acid stream to a shear rate of less than less than 150,000 $S^{+1}$; and extracting the ions from the separated organic phase with a water stream while subjecting the separated organic phase and the water stream to a shear rate of less than less than 150,000 $S^{-1}$; to form a purified organic phase comprising a purified polycarbonate.

In another embodiment, a process of purifying an interfacially polymerized polycarbonate from a feed comprising an aqueous phase and an organic phase comprising an organic solvent, the interfacially polymerized polycarbonate, a catalyst, and ions, can comprise: separating the aqueous phase and the organic phase from the feed, wherein during the separating the feed is subjected to at least one of: energy of less than or equal to 0.5 kJ/kg of feed, a shear rate of less than 150,000 $S^{-1}$, and centrifugal forces of 100 to 2,000 g-force; to form a purified aqueous phase and a purified organic phase comprising a purified polycarbonate.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Figure 1:
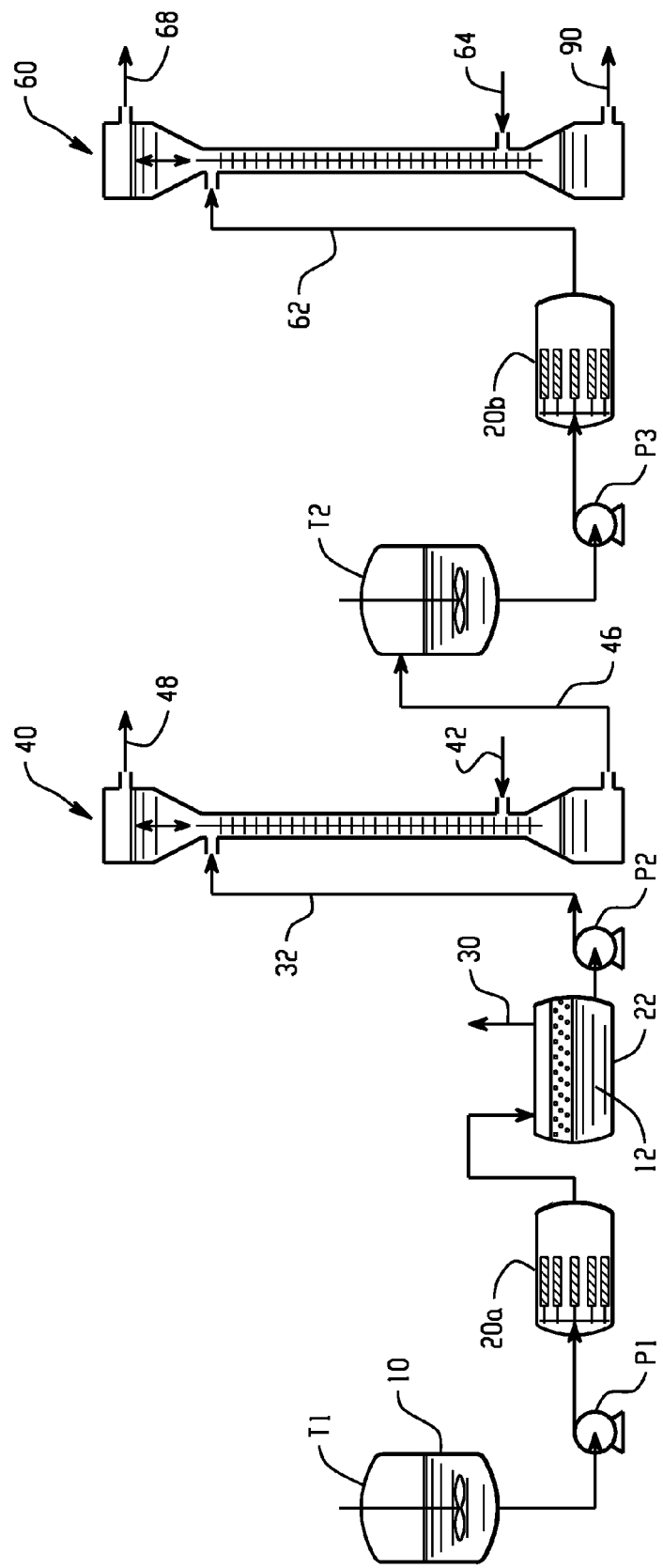
FIG. 1 is a schematic diagram of a purification process utilizing low shear coalescers, a low shear decanter, and two low shear separation columns.

Interfacial polymerization to form polycarbonate results in a product mixture comprising an organic phase that contains the polycarbonate, and an aqueous phase that contains ions and a catalyst. It was previously thought that a high shear rate (greater than 150,000 reciprocal seconds ($S^{-1}$)) was needed to enable good partitioning between the two phases such that polycarbonate did not remain in the aqueous phase and impurities such as ions and catalyst did not remain in the organic phase. A high shear rate results in smaller droplets (for example, with an average diameter of less than or equal to 20 micrometers), thereby increasing the surface area between the two phases. It was believed that the increased surface area resulted in the increased diffusion, for example, increased movement of ions and catalyst from the organic phase to the aqueous phase. High shear rates, however, can increase or cause additional emulsification of the two phases due to intense mixing. The formation of an emulsion can result in the presence of the polycarbonate in the aqueous phase, which can reduce the amount of polycarbonate that can be purified. The formation of an emulsion can also result in the presence of impurities such as salts and ions in the organic phase, which affects the polycarbonate quality.

It was surprisingly discovered that a low shear purification process, where the aqueous phase and the organic phase are subjected to a shear rate of less than 150,000 $S^{-1}$, can reduce or eliminate emulsification and enable good separation. As used herein, "shear rate" is the ratio of velocity and characteristic dimension of a passage through which a fluid is flowing. For example, if a fluid is rotating at the speed of 1 meter per second (m/s) and the fluid is forced to circuit through a 1 millimeter (mm) gap between mixer and vessel wall, then the shear rate is 1/0.001=1,000 $S^{-1}$. "Good separation" means that the amount of organic phase remaining in a separated aqueous phase is less than or equal to 10 volume percent (vol %), specifically, 0 to 10 vol %, more specifically, 0 to 7 vol %, more specifically, 0 to 5.5 vol %, and even more specifically, 0 to 2 vol % based on the total volume of the separated aqueous phase and any organic phase remaining in the separated aqueous phase; or that the amount of aqueous phase remaining in a separated organic phase is less than or equal to 10 vol %, specifically, 0 to 10 vol %, more specifically, 0 to 7 vol %, more specifically, 0 to 5.5 vol %, and even more specifically, 0 to 2 vol % based on the total volume of the separated organic phase and any aqueous phase remaining in the separated organic phase; or that both of the foregoing conditions are satisfied.

Specifically, it was discovered that the separation of the organic phase and the aqueous phase, as well as the extraction of the ions and the interfacial catalyst from an organic phase can be performed at a shear rate of 0.5 to less than 150,000 $S^{-1}$, or 0.5 to less than 125,000 $S^{-1}$, or 0.5 to less than 100,000 $S^{-1}$, or 0.5 to less than 50,000 $S^{-1}$, for example, 1.0 to less than 140,000 $S^{-1}$, or 10 to 130,000 $S^{-1}$, or 200 to 130,000 $S^{-1}$, or 1,000 to 120,000 $S^{-1}$, or 20,000 to 110,000 $S^{-1}$, or 50,000 to 100,000 $S^{-1}$. Very low shear rates can be used, such as a very low shear rate of 0.5 to 1,000 $S^{-1}$, or 0.5 to 750 $S^{-1}$, or 0.5 to 500 $S^{-1}$. For example, a shear rate of 100 to 500 $S^{-1}$, or 150 to 250 $S^{-1}$. These low shear rates can be achieved using an agitated tank; a shear rate of 0.5 to 100 $S^{-1}$, 0.5 to 50 $S^{-1}$, 0.5 to 10 $S^{-1}$, or 0.5 to 5 $S^{-1}$ can be achieved using a plate decanter; a shear rate of 0.5 to 100 $S^{-1}$, 0.5 to 50 $S^{-1}$, 0.5 to 10 $S^{-1}$, or 0.5 to 5 $S^{-1}$ can be achieved using a low shear rate coalescer comprising a decanting zone; and a shear rate of 0.5 to 100 $S^{-1}$, 0.5 to 50 $S^{-1}$, 0.5 to 20 $S^{-1}$, or 1 to 10 $S^{-1}$ can be achieved using a low shear extraction column. A combination comprising one or more of the foregoing shear rates and devices can be used in the purification process. It is noted that a device that has the ability to operate at a high shear rate can be considered a low shear rate device, provided that it is operated at the above-described low shear rates. For example, a disk stack centrifuge can be operated at a low shear rate of 5,000 to less than 150,000 $S^{-1}$, specifically, 10,000 to 130,000 $S^{-1}$, more specifically, 25,000 to 100,000 $S^{-1}$, even more specifically, 50,000 to 100,000 $S^{-1}$. A rotator-stator mixer can be operated at a shear rate of 10,000 to 100,000 $S^{-1}$, specifically, 20,000 to 100,000 $S^{-1}$, more specifically, 30,000 to 100,000 $S^{-1}$.

Likewise, any additional equipment used in the purification process, for example, pumps and storage tanks under agitation, for example, rotator-stators or agitated tanks, can also be operated under low shear rate conditions such that they also impart a shear rate of less than 150,000 $S^{-1}$, less than or equal to 20,000 $S^{-1}$, 1 to 1,000 $S^{-1}$, 5 to 500 $S^{-1}$, 50 to 300 $S^{-1}$, or 100 to 300 $S^{-1}$.

For example, a low shear separation device can be used to separate a feed containing an emulsion or a feed that is prone to forming an emulsion, where the low shear separation device subjects to at least one of an energy of less than or equal to 0.5 kiloJoules per kilogram (kJ/kg) of feed, e.g., 0.001 to 0.5 kJ/kg of feed:

a shear rate of less than 150,000 $S^{-1}$, e.g., of 0.5 to 100,000, or of 0.5 to 1,000 $S^{-1}$; and centrifugal forces of 100 to 2,000 g-force, or 100 to 1,000 g-force, or 500 to 800 g-force to the feed can provide good separation of the two phases and, where present, can reduce or virtually eliminate the emulsion. For example, where a feed is separated in a low shear centrifuge that imparts one or more of an energy less than or equal to 0.5 kJ/kg of feed, centrifugal forces of 100 to 2,000 g-force, and a centrifugal force of 100 to 1,000 g-force, or 500 to 800 g-force, the centrifuge can function as a coalescer to break an emulsion that has already been formed in the feed, i.e., the centrifuge can reduce or virtually eliminate emulsification and can still result in good separation. By way of comparison, a typical high shear device such as a disc type centrifuge imparts energy in the range of 1 to 10 kJ/kg.

In addition to the low shear processes and devices herein, a coalescer, to coalesce droplets of one phase in another phase, can be used in the purification at one or more steps. The coalescer is especially useful when emulsification occurs even before the purification begins, for example, during the transfer of a product mixture from a reactor to the purification units, or at any other step. Under this circumstance, a low shear rate process can reduce or eliminate further carryover and emulsification, but may have a limited effect on already-created droplets. Use of a coalescer to increase droplet size further improves separation and the removal of ions and catalyst from the separated organic phase. An acidic aqueous stream can be added to a coalesced mixture to lower a pH of the coalesced aqueous phase to less than or equal to 3, specifically, to less than 3.

Use of a low shear separation process as described herein is especially useful for the separation of a feed comprising an aqueous and an organic phase where the organic phase has a viscosity of less than or equal to 100 centipoise (cP), specifically, 0.01 to 50 cP, or 0.1 to 10 cP. The organic phase of the feed after separation can have a viscosity of less than or equal to 100 centipoise (cP), specifically, 0.01 to 50 cP, more specifically, 0.1 to 10 cP. Viscosity of the organic phase of the feed after separation can be determined by separating a test sample. Viscosity can be determined, for example, by ASTM D5225-09 or by ISO 1628-5.

The feed stream can comprise an emulsion, where the emulsion can be a "water-in-oil" type emulsion, in which the continuous phase is organic and the dispersed phase is aqueous; an "oil-in-water" type emulsion, in which continuous phase is aqueous and the dispersed phase is organic; or bicontinuous, in which both phases are continuous. The feed stream can comprise a feed comprising an organic phase and an aqueous phase that are prone to emulsification.

The feed for separation can comprise an interfacial polymerization product stream, a separated stream from a phase separation process, a recycle stream for re-entry to the interfacial polymerization reaction, a wash stream, a transfer stream (for example, where an emulsion developed during a transfer process), a stored stream (for example, where an emulsion developed during a storage period, for example, from a storage tank with agitation), or a combination comprising one or more of the foregoing. Any transfer or storage step (for example, agitated storage) can result in an emulsion-containing or an emulsion-prone feed stream, as well as any flushing or cleaning steps. The feed can be a single stream or a combination of different streams, for example, two or more wash streams. Alternatively, a feed can be split into a plurality of feeds that can be treated individually.

The wash stream can be generated when, for example, hood(s), centrifuge(s), reactor(s), equipment in various units are washed (also referred to as flushed) with an organic solvent, generating an organic polycarbonate wash stream. Organic polycarbonate wash streams from an interfacial polycarbonate manufacturing process can comprise aqueous-extractable ions, interfacial polycarbonate catalyst, or a combination comprising at least one of the foregoing. An extracting aqueous phase can be used to extract ions and catalyst from the wash stream, where the aqueous phase and the organic phase from the wash stream can then be separated using a low shear separation process.

As the feed can arise from any point in the polycarbonate manufacturing process, an interfacial polycarbonate product mixture comprising an aqueous and an organic phase can be separated by a high shear process using, e.g., a disc centrifuge; and a feed comprising an emulsion (the cream) from the separation can be separated in a low shear process as described herein. The high shear separation process can be performed on the product mixture before catalyst removal, after catalyst removal, after ion removal, after simultaneous catalyst and ion removal, or a combination comprising at least one of the foregoing stages.

For example, interfacial polymerization provides a mixture of an aqueous phase that comprises water, ions, and catalyst, and an organic phase that comprises organic solvent (for example, dichloromethane, dichloroethane, methylene chloride, or a combination comprising one or both of the foregoing), polycarbonate, and, to a lesser degree than the aqueous phase, water, ionic species, and catalyst. The aqueous phase and the organic phase of the product mixture are first separated, for example, in a low shear separation process. Next, the separated organic phase can be extracted, for example, in a low shear separation process, to remove the interfacial catalyst and the ions. The catalyst can be extracted, for example, in a low shear separation process, from the separated organic phase before the extraction of the ions, or the catalyst and the ions can be extracted in a single extraction process. As described above, any of the foregoing processes can be a low shear process and/or can result in an emulsified stream that is used as the feed for the low shear process described herein.

"Polycarbonate" as used herein means a homopolymer or copolymer having repeating structural carbonate units of formula (1)

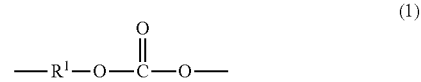

(1)

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (2) or a bisphenol of formula (3).

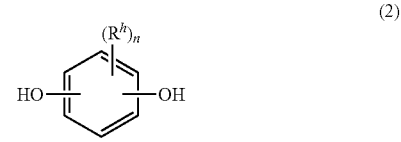

(2)

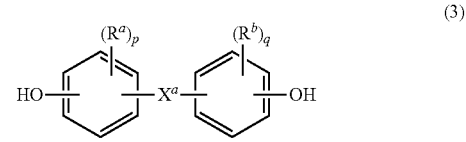

(3)

In formula (2), each $R^h$ is independently a halogen atom, for example, bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{1-12}$ alkoxy, or $C_{1-12}$ alkyl; and p and q are each independently integers of 0 to 4, such that when p or q is less than 4, the valence of each carbon of the ring is filled by hydrogen. In an embodiment, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Some illustrative examples of specific dihydroxy compounds include the following: bisphenol compounds such as 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

Specific dihydroxy compounds include resorcinol, 2,2-bis(4-hydroxyphenyl) propane ("bisphenol A" or "BPA", in which each of $A^1$ and $A^2$ is p-phenylene and $Y^1$ is isopropylidene in formula (3)), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane (DMBPC), and 1,1-bis(4-hydroxy-3-methylphenyl)-3,3,5-trimethylcyclohexane (isophorone bisphenol).

"Polycarbonate" as used herein also includes copolymers comprising carbonate units and other types of polymer units, such as ester units ("polyestercarbonates", also known as polyester-polycarbonates). Polyestercarbonates further contain, in addition to recurring carbonate chain units of formula (1), repeating ester units of formula (4)

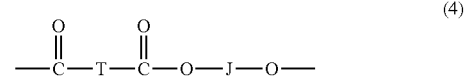

(4)

wherein J is a divalent group derived from a dihydroxy compound, and can be, for example, a $C_2$-10 alkylene, a $C_{6-20}$ cycloalkylene a $C_{6-20}$ arylene, or a polyoxyalkylene group in which the alkylene groups contain 2 to 6 carbon atoms, specifically, 2, 3, or 4 carbon atoms; and T is a divalent group derived from a dicarboxylic acid, and can be, for example, a $C_2$-10 alkylene, a $C_{6-20}$ cycloalkylene, or a $C_{6-20}$ arylene. Copolyesters containing a combination of different T and/or J groups can be used. The polyesters can be branched or linear.

Specific dihydroxy compounds include aromatic dihydroxy compounds of formula (2) (e.g., resorcinol), bisphenols of formula (3) (e.g., bisphenol A), an aliphatic diol such as ethane diol, n-propane diol, i-propane diol, 1,4-butane diol, 1,4-cyclohexane diol, 1,4-hydroxymethylcyclohexane, or a combination comprising at least one of the foregoing dihydroxy compounds. Aromatic dicarboxylic acids that can be used include terephthalic acid, isophthalic acid, naphthalene dicarboxylic acid, 1,4-cyclohexane dicarboxylic acid, or a combination comprising at least one of the foregoing acids. A combination of isophthalic acid and terephthalic acid wherein the weight ratio of isophthalic acid to terephthalic acid is 91:9 to 2:98 can be used. Specific ester units include ethylene terephthalate, n-propylene terephthalate, n-butylene terephthalate 1,4-cyclohexanedimethylene terephthalate, and ester units derived from isophthalic acid, terephthalic acid, and resorcinol (ITR).

The molar ratio of ester units to carbonate units in the copolymers can vary broadly, for example, 1:99 to 99:1, specifically, 10:90 to 90:10, more specifically, 25:75 to 75:25. Specific polyestercarbonates are those including bisphenol A carbonate units and isophthalate-terephthalate-bisphenol A ester units, also commonly referred to as poly(carbonate-ester)s (PCE) poly(phthalate-carbonate)s (PPC), depending on the molar ratio of carbonate units to ester units.

In a specific embodiment, the polycarbonate is a linear homopolymer containing bisphenol A carbonate units (BPA PC). However, the low shear processes described herein are especially useful for the purification of polyesters such as PPC and PEC, and copolycarbonates including bisphenol A and bulky bisphenol carbonate units, i.e., derived from bisphenols containing at least 12 carbon atoms, for example, 12 to 60 carbon atoms or 20 to 40 carbon atoms. Examples of such copolycarbonates include copolycarbonates comprising bisphenol A carbonate units and 2-phenyl-3,3'-bis(4-hydroxyphenyl) phthalimidine carbonate units (a BPA-PP-PBP copolymer), a copolymer comprising bisphenol A carbonate units and 1,1-bis(4-hydroxy-3-methylphenyl)cyclohexane carbonate units (a BPA-DMBPC copolymer), and a copolymer comprising bisphenol A carbonate units and isophorone bisphenol carbonate units (available, for example, under the trade name APEC from Bayer).

The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 milligram per milliliter (mg/mL), and are eluted at a flow rate of 1.5 milliliter per minute (mL/min).

The reaction conditions for interfacial polymerization to produce the polycarbonates can vary, but a process can involve dissolving or dispersing the dihydroxy compound in aqueous NaOH or KOH, adding the resulting mixture to a water-immiscible solvent, and contacting the reactants with a carbonate precursor in the presence of a catalyst such as a tertiary amine or a phase transfer catalyst, under controlled pH conditions, e.g., 8 to 10. The water-immiscible solvent can be, for example, methylene chloride, ethylene dichloride, 1,2-dichloroethane, chlorobenzene, toluene, and the like.

The carbonate precursor can be a carbonyl halide, a bishaloformate of a dihydroxy compound, or a diaryl carbonate. The carbonyl halide can be carbonyl bromide or carbonyl chloride (phosgene). The bischloroformate can be the bischloroformate of bisphenol A, hydroquinone, ethylene glycol, neopentyl glycol, or the like. The diaryl carbonate can be a diaryl carbonate of formula (5)

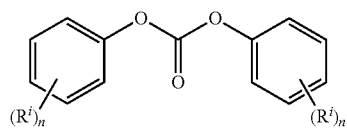

(5)

wherein n is an integer 1 to 3 and each $R^i$ is independently a linear or branched, optionally substituted $C_{1-34}$ alkyl (specifically $C_{1-6}$ alkyl, more specifically $C_{1-4}$ alkyl), $C_{1-34}$ alkoxy (specifically $C_{1-6}$ alkoxy, more specifically $C_{1-4}$ alkoxy), $C_{5-34}$ cycloalkyl, $C_{7-34}$ alkylaryl $C_{6-34}$ aryl, a halogen (specifically a chlorine), or —C(=O)OR' wherein R' is H, linear or branched $C_{1-34}$ alkyl (specifically $C_{1-6}$ alkyl, more specifically $C_{1-4}$ alkyl), $C_{1-34}$ alkoxy (specifically $C_{1-16}$ alkoxy, specifically $C_{1-4}$ alkoxy), $C_{5-34}$ cycloalkyl, $C_{7-34}$ alkylaryl, or $C_{6-34}$ aryl. In an embodiment, the diaryl carbonate is diphenyl carbonate, or a diaryl carbonate wherein one or both aryl groups have an electron-withdrawing substituents, for example, bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate. A molar ratio of diaryl carbonate to dihydroxy compound can be 2:1 to 1:2, or 1.5:1 to 1:1.5, or 1.05:1 to 1:1.05, or 1:1. In an embodiment, the molar ratio of the diaryl carbonate to the dihydroxy compound when expressed to three decimal places is 0.996 or less, or 0.962 to 0.996, or 0.968 to 0.996, or 0.971 to 0.994. Combinations comprising at least one of the above described types of carbonate precursors can be used.

Interfacial polymerization reaction to form carbonate linkages using phosgene as a carbonate precursor is advantageously used to manufacture the polycarbonates purified by the processes described herein. In the manufacture of polyester-polycarbonates by interfacial polymerization, rather than using the dicarboxylic acid or diol per se, the reactive derivatives of the acid or diol, such as the corresponding acid halides, in particular the acid dichlorides and the acid dibromides can be used. Thus, for example, instead of using isophthalic acid, terephthalic acid, or a combination comprising at least one of the foregoing acids, isophthaloyl dichloride, terephthaloyl dichloride, or a combination comprising at least one of the foregoing dichlorides can be used.

Among tertiary amines that can be used as catalysts in interfacial polymerization are aliphatic tertiary amines such as triethylamine and tributylamine, cycloaliphatic tertiary amines such as N,N-diethyl-cyclohexylamine, and aromatic tertiary amines such as N,N-dimethylaniline. Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Examples of phase transfer catalysts include $(CH_3(CH_2)_3)_4NX$, $(CH_3(CH_2)_3)_4PX$, $(CH_3(CH_2)_5)_4NX$, $(CH_3(CH_2)_6)_4NX$, $(CH_3(CH_2)_4)_4NX$, $CH_3(CH_3(CH_2)_3)_3NX$, and $CH_3(CH_3(CH_2)_2)_3NX$, wherein X is Cl⁻, Br⁻, a $C_{1-8}$ alkoxy group or a $C_6$-18 aryloxy group. An effective amount of a phase transfer catalyst can be 0.1 to 10 weight percent (wt %), or 0.5 to 2 wt %, each based on the weight of bisphenol in the phosgenation mixture.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of 0.05 to 2.0 wt %. Combinations comprising linear polycarbonates and branched polycarbonates can be used.

An end-capping agent (also referred to as a chain stopper agent or chain terminating agent) can be included during polymerization to provide end groups. The end-capping agent (and thus, end groups) are selected based on the desired properties of the polycarbonates. Exemplary end-capping agents are exemplified by monocyclic phenols such as phenol and $C_1$-$C_{22}$ alkyl-substituted phenols such as p-cumyl-phenol, resorcinol monobenzoate, and p- and tertiary-butyl phenol, monoethers of diphenols, such as p-methoxyphenol, and alkyl-substituted phenols with branched chain alkyl substituents having 8 to 9 carbon atoms, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, mono-carboxylic acid chlorides such as benzoyl chloride, $C_1$-$C_{22}$ alkyl-substituted benzoyl chloride, toluoyl chloride, bromobenzoyl chloride, cinnamoyl chloride, and 4-nadimidobenzoyl chloride, polycyclic, mono-carboxylic acid chlorides such as trimellitic anhydride chloride, and naphthoyl chloride, functionalized chlorides of aliphatic monocarboxylic acids, such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used.

Interfacial polymerization produces a mixture of an aqueous (brine) phase that comprises water, ions, and catalyst, and an organic (polymer) phase that comprises organic solvent, polycarbonate, and, to a lesser degree than the aqueous phase, water, ions, and catalyst. During purification, the aqueous phase and the organic phase of this product mixture can be first separated. Next, the organic phase can be extracted to remove the ions and catalyst from the separated organic phase. The catalyst can be extracted from the separated organic phase before the extraction of the ions, or the catalyst and the ions can be extracted in a single extraction process.

Separation of a feed and purification of an organic phase therefrom can be accomplished utilizing at least one low shear rate device, which, exposes the feed and the resultant separated organic phase to a shear rate of less than 150,000 $S^{-1}$.

Examples of low shear rate devices (e.g., separators) include low shear rate decanters low shear rate centrifuges, low shear rate extraction columns (such as those operated in counter current mode), low shear rate centrifuges, low shear rate coalescers (such as low shear rate separating coalescers). A combination comprising one or more of the foregoing devices can be used. The low shear devices can be devices capable of higher shear rates, but operated at rates less than 150,000 $S^{-1}$.

A coalescer can be employed before a separation step. The coalescer can be a separate unit, for example, a separate coalescer unit and decanter unit can be used. Alternatively, a coalescer with a decanting zone can be used. For convenience in the description below, coalescers with a decanting zone are referred to in the following figures as "low shear rate separating coalescers"; however, it is to be understood that, a separate coalescer and decanter or a coalescer with a decanting zone can be used.

Any of the streams containing droplets of another phase (and in particular the product mixture or the separated organic phase) can be treated in a coalescer to increase droplet size. Such increase further improves separation of the phases and the removal of water, ions, and catalyst from the separated organic phase. A coalescer can be used when aqueous droplets in an organic phase having an average diameter of less than 200 micrometers, less than 100 micrometers, less than 50 micrometers, less than 25 micrometers, or less than 10 micrometers. There is no particular lower limit, but it can be, for example, 0.1 micrometer.

Likewise, any additional equipment used in the separation and extraction, for example, pumps, storage tanks under agitation, and low shear coalescers (such as ones that function to increase the droplet size of one of the phases) can be operated under low shear rate conditions such that they also impart a shear rate of less than about 150,000 $S^{-1}$ as described above, or the very low shear rates as described above. Under these conditions, the separation and extraction of the organic phase, including any transfer and/or storage (for example, agitated storage) step that occurs in connection with the separation and extraction results in decreased formation of an emulsion. The process can be performed such that no emulsion is formed during the separating of the aqueous and the organic phases, during the extracting of the catalyst or ions, and during any transfer and/or storage (for example, with agitated storage) step that occurs in between any of the aforementioned steps. For example, droplets of organic phase can become dispersed in the aqueous phase.

An apparatus for a low shear rate purification of polycarbonate from an interfacial product mixture is shown schematically in FIG. 1. FIG. 1 illustrates that a product mixture 10 comprising an aqueous and an organic phase can be fed via a pump P1 from a tank T1 into an optional low shear rate coalescer 20a to increase the size of aqueous phase droplets in the organic phase of the mixture, and then into a low shear rate decanter 22. The aqueous phase can be removed from the low shear rate decanter 22 as a purified aqueous stream 30. The separated organic phase 12 can then be pumped into a low shear rate catalyst extraction column 40 via a pump P2. The low shear rate catalyst extraction column 40 can be operated in counter current mode where a low pH stream 42, for example, with a pH of less than or equal to 3, specifically, less than or equal to 2, more specifically, 0.5 to 2, even more specifically, 1 to 1.5, can be introduced into the bottom of the column and can exit at the top of the column with extracted catalyst as a catalyst rich aqueous stream 48. The separated organic stream 32 can enter the low shear rate catalyst extraction column 40 at the top of the column and can leave with a reduced catalyst concentration at the bottom of the column as reduced catalyst organic stream 46. The reduced catalyst organic stream 46 can be directed to optional tank T2 and can then be pumped into an optional second low shear coalescer 20b as shown via a pump P3 to increase the size of any aqueous phase droplets that may be present. The coalesced, reduced catalyst organic stream 62 can then enter at the top of a low shear rate ion extraction column 60 that can also optionally be a counter current extraction column. A water stream 64 can enter the bottom of the column and can exit the top of the column as an ion rich stream 68. A purified resin stream 90 comprising solvent and purified polycarbonate can exit the bottom of the low shear ion extraction column 60.

Figure 2:
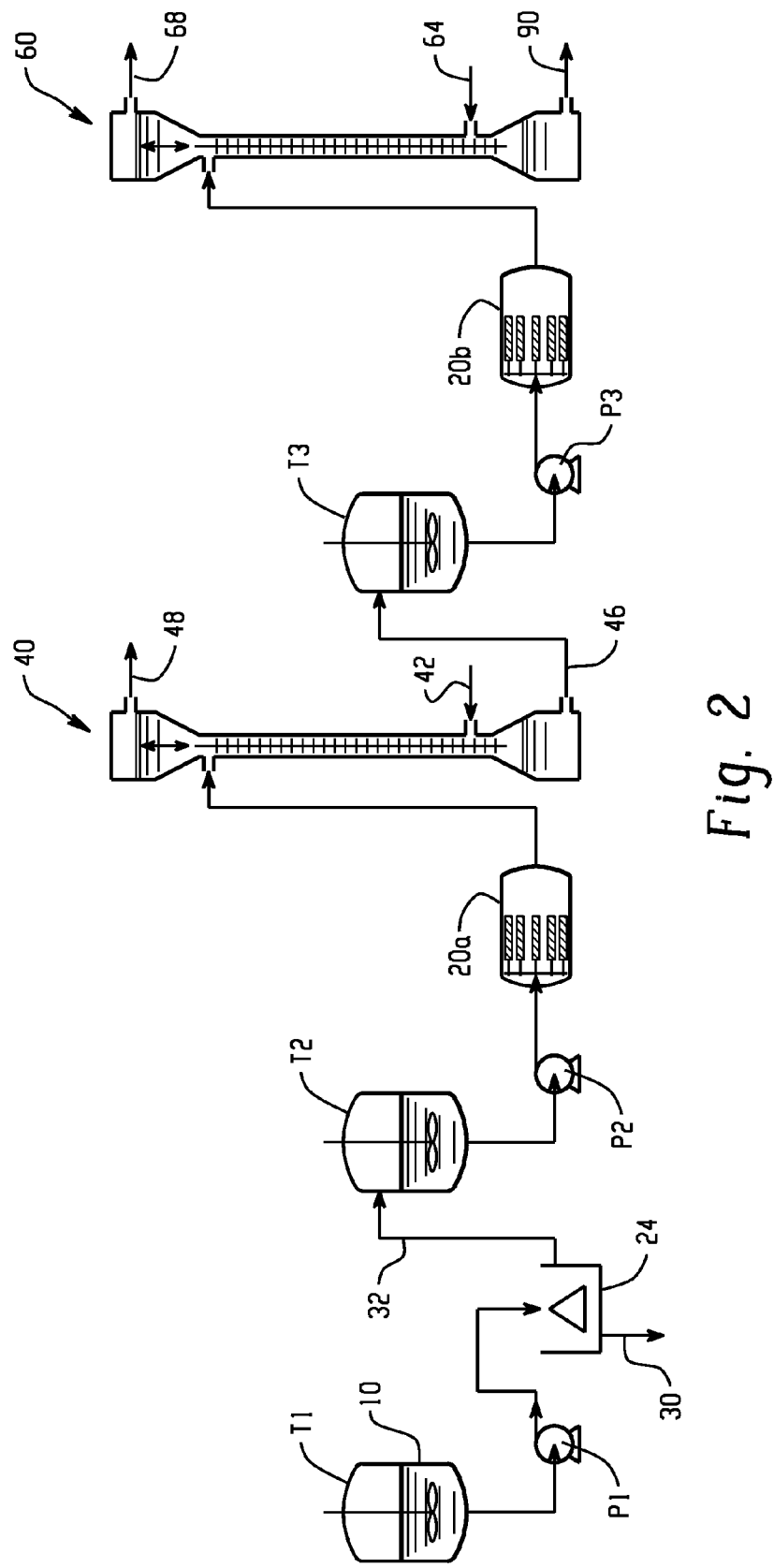
FIG. 2 is a schematic diagram of a purification process utilizing low shear coalescers, a low shear centrifuge, and two low shear separation columns.

FIG. 2 illustrates a similar apparatus and process as that of FIG. 1 except that FIG. 2 illustrates that the separation of the aqueous phase and the organic phase can occur by introducing a product mixture comprising an aqueous and an organic phase via a pump P1 from a tank T1 into a low shear rate centrifuge 24. It is noted that the centrifuge can be a high shear rate centrifuge operated at standard high shear rates, while the remaining process is conducted under low shear rate conditions. Alternatively, the centrifuge can be operated at low shear rates. Where an emulsion formed, the emulsion can be separated from the aqueous and organic streams and treated separately. The aqueous phase can be removed from the low shear rate centrifuge 24 as a purified aqueous stream 30. The separated organic stream 32 can then be pumped into an optional tank T2 and then into a low shear rate coalescer 20a via a pump P2, where after coalescence, the stream can be introduced to one or more extraction columns for catalyst and ion removal.

Figure 3:
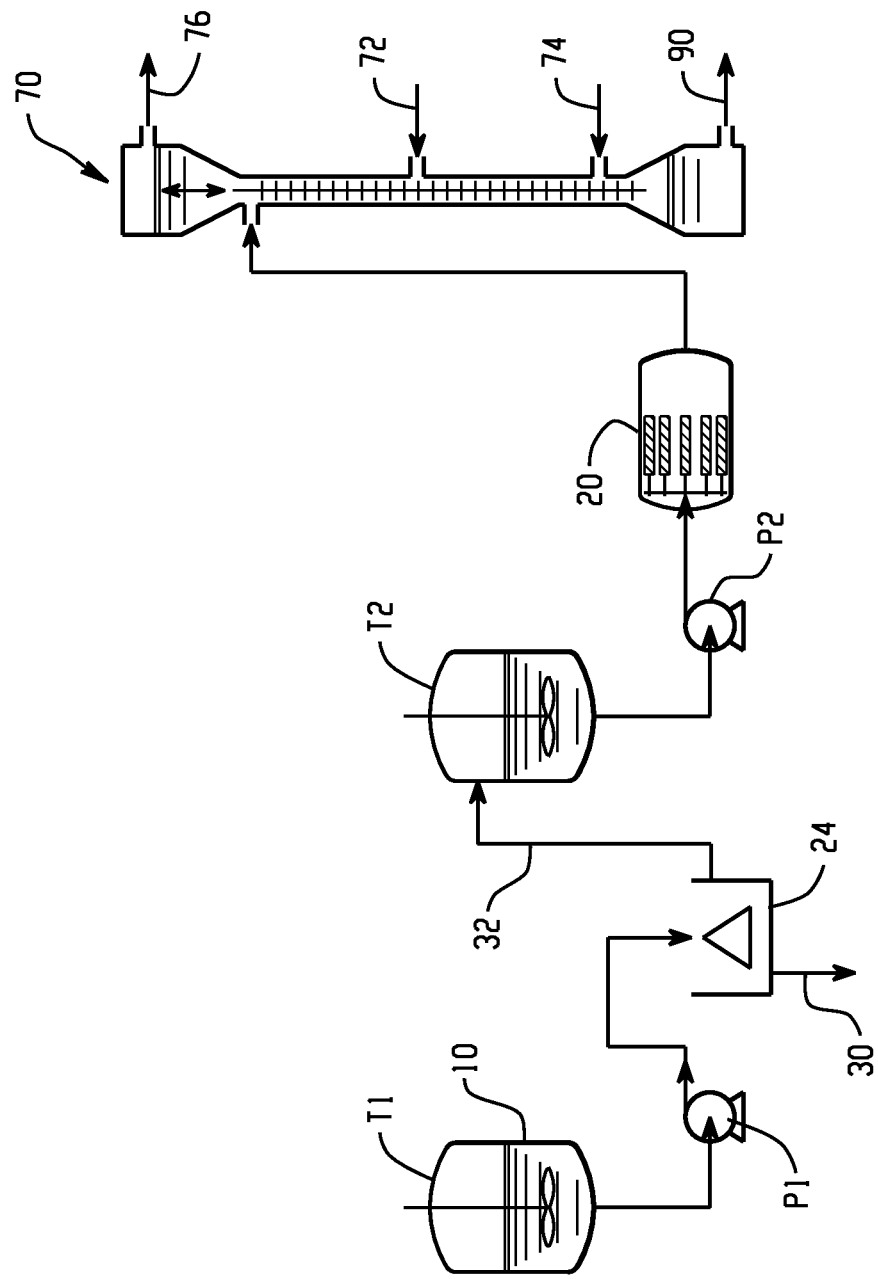
FIG. 3 is a schematic diagram of a purification process utilizing a low shear coalescer, a low shear centrifuge, and a dual, low shear separation column.

FIG. 3 illustrates a similar process as that of FIG. 2 except that the catalyst extraction step and the ion extraction step can occur simultaneously in the low shear rate dual extraction column 70. The separated organic phase 32 can optionally pass through a low shear rate coalescer 20 and can enter the top of the low shear rate dual extraction column 70, and can exit the bottom of the column as a purified polycarbonate stream 90. The catalyst can be removed in the upper part of the column by introducing a low pH stream 72 (between the ends of the column, e.g., near the middle of the column) and the residual ions can be removed in a lower part of the column by introducing a water stream 74 near the bottom of the column. A catalyst/ion rich stream 76 can exit the top of the column.

Figure 4:
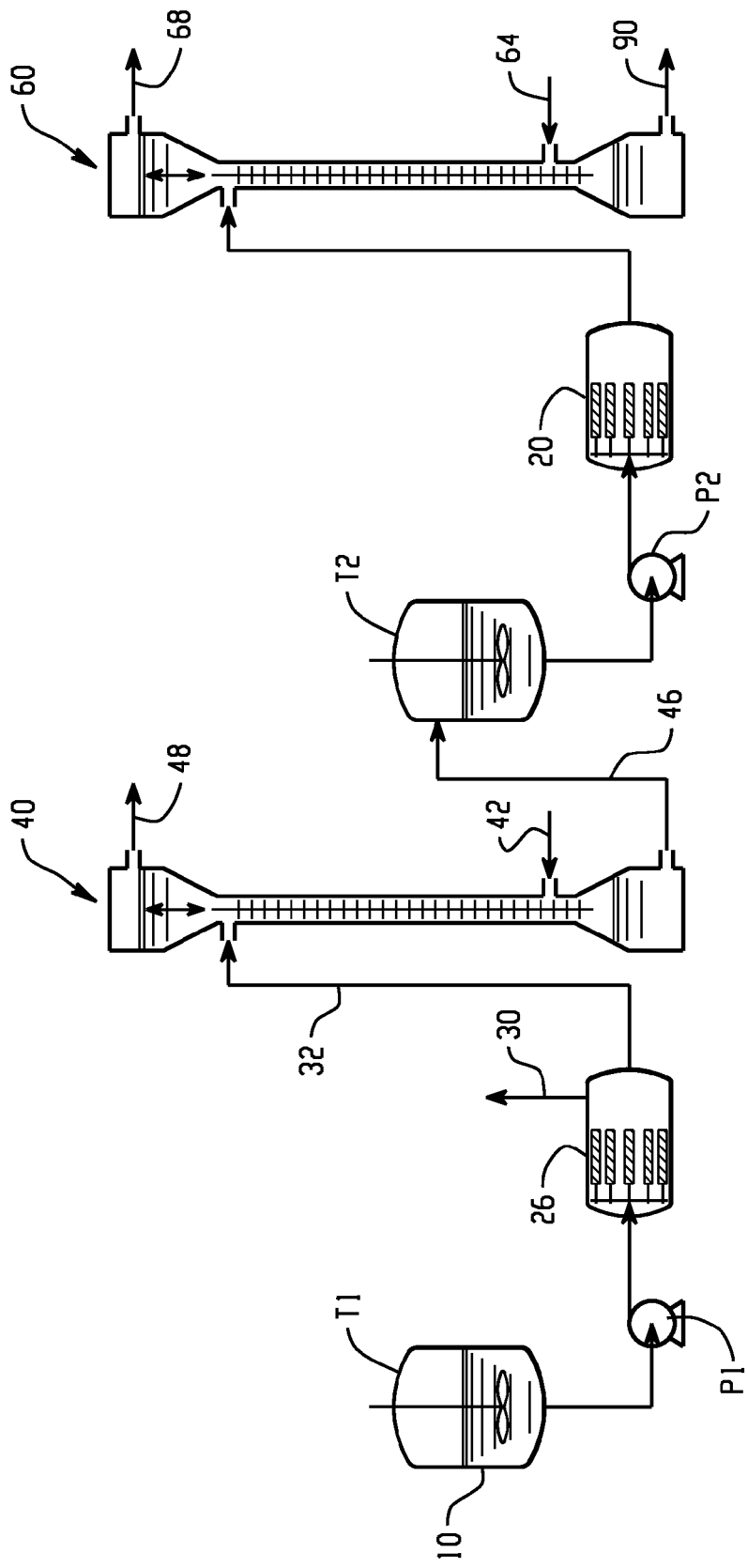
FIG. 4 is a schematic diagram of a purification process utilizing a low shear coalescer, a low shear separation coalescer, and two low shear separation columns.
Figure 5:
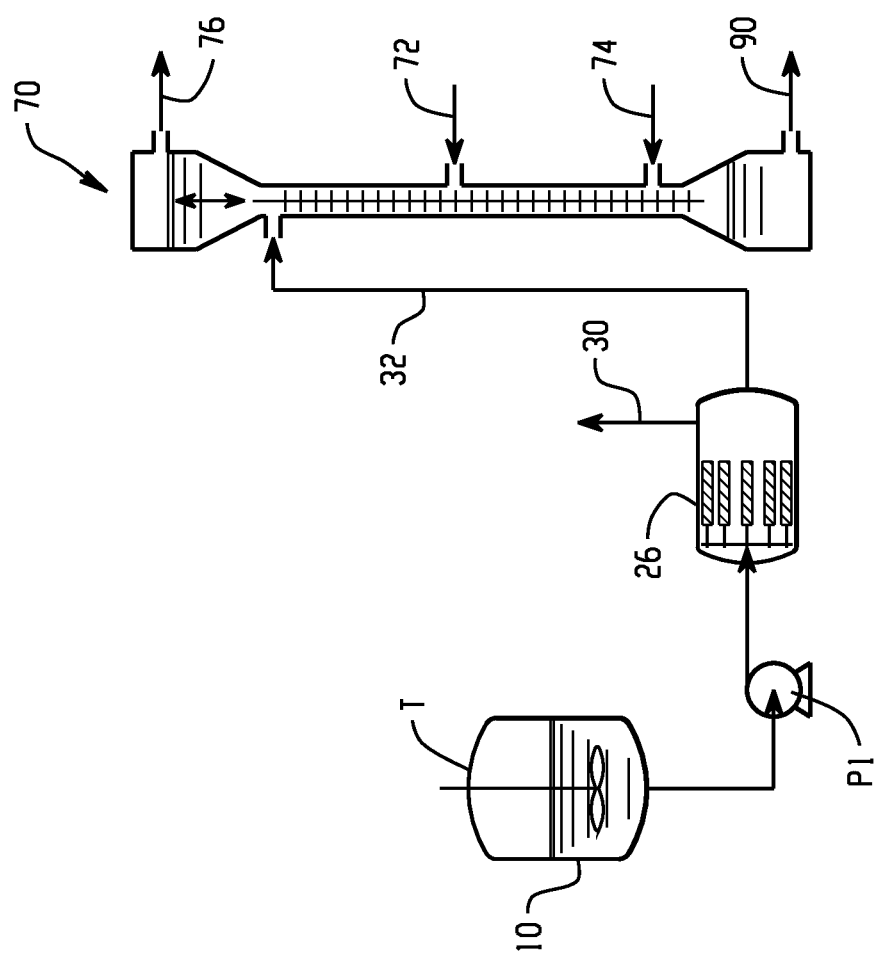
FIG. 5 is a schematic diagram of a purification process utilizing a low shear separation coalescer and a dual, low shear separation column.

FIGS. 4 and 5 illustrate similar processes to those of FIGS. 1 and 3, respectively, except that the figures illustrate that separation of the aqueous phase and the organic phase can occur by introducing a product mixture 10 comprising an aqueous and an organic phase via a pump P1 from a tank T1 into a low shear rate separating coalescer 26 having a decanting zone. An advantageous feature of this embodiment is that as shown in the Examples below, the organic stream can be simultaneously separated and purified by the extraction of ions. As shown in FIG. 4, the separated aqueous phase can leave the low shear rate separating coalescer 26 as a separated aqueous stream 30. The separated, reduced ion organic stream 32 can then be introduced to a series of low shear rate extraction columns (e.g., a reciprocating plate column) 40 and 60 for catalyst and residual ion removal, similar to that illustrated in FIG. 1. The separated, reduced ion, reduced catalyst organic stream (46) from low shear column 46 can be stored in optional tank T2, and introduced to low shear ion extraction column 60 via an optional low shear rate coalescer 20. Operation of the low shear ion extraction column 60 as described in FIG. 1 can remove both residual catalyst and residual ions, and results in a purified resin stream 90 comprising solvent and purified polycarbonate. FIG. 5 illustrates a purification process wherein after the low shear rate separating coalescer 26, the separated, purified organic stream 32 can be introduced to a low shear rate dual extraction column 70 for simultaneous catalyst and residual ion removal, similar to that illustrated in FIG. 3.

Figure 6:
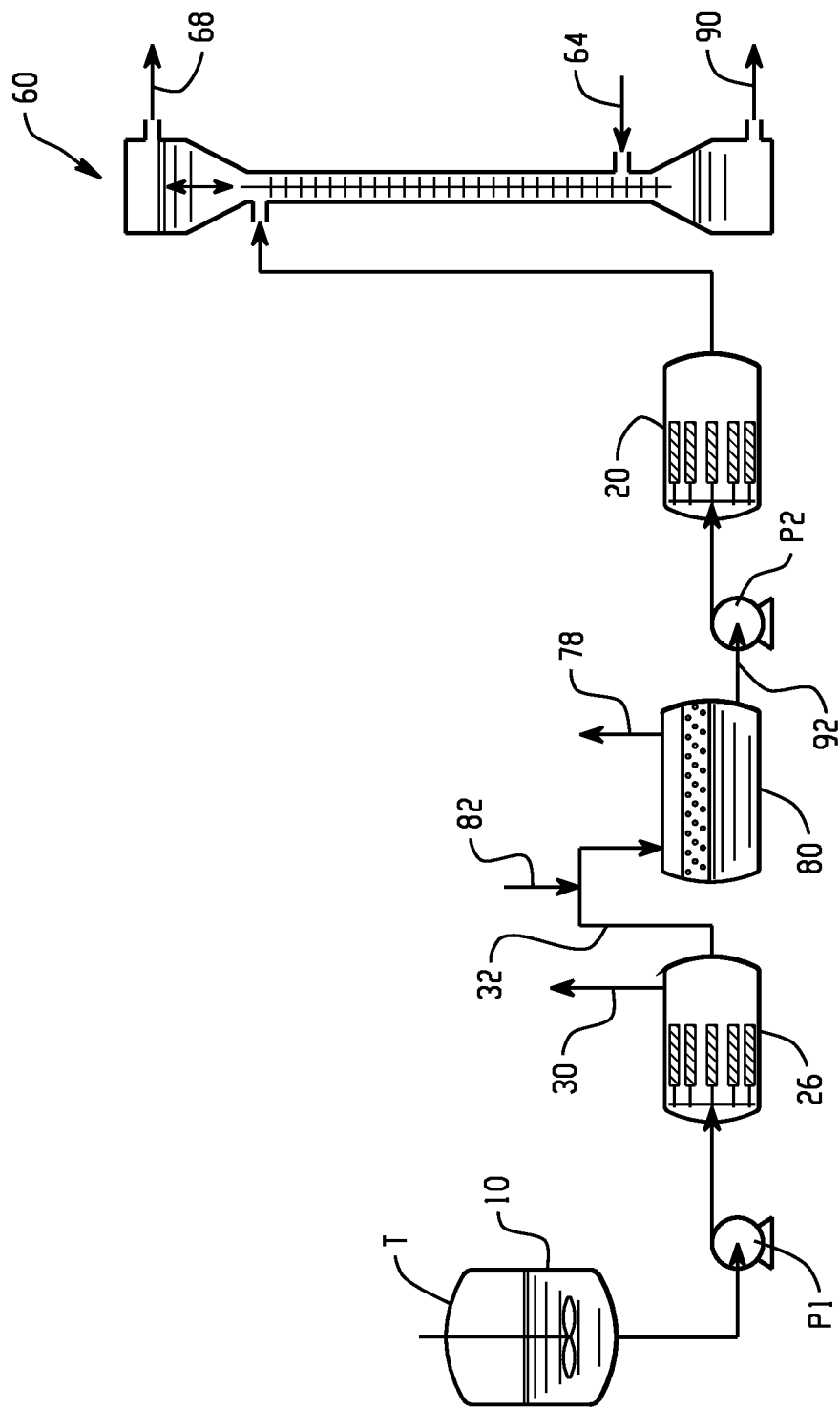
FIG. 6 is a schematic diagram of a purification process utilizing a low shear coalescer, a low shear separation coalescer, a low shear decanter, and a dual, low shear separation column.

FIG. 6 illustrates that separation of the aqueous phase and the organic phase can occur by introducing a product mixture 10 comprising an aqueous and an organic phase via a pump P1 from a tank T1 into a low shear rate separating coalescer 26 having a decanting zone, where the aqueous phase can optionally leave the low shear rate separating coalescer 26 as a purified aqueous stream 30. It is noted that the coalescer can be a coalescer that does not have a decanting zone; rather, the coalesced, combined separated aqueous and organic streams 32 can then be combined with an acid stream 82 and can be introduced to a low shear rate decanter 80 for an acid wash to remove the catalyst. The catalyst can be removed in an aqueous catalyst-rich stream 78. The acid-washed separated and reduced catalyst, reduced ion organic stream 92 can be introduced to an optional low shear rate coalescer 20, and then the residual ions can be removed in a low shear rate extraction column (e.g., a reciprocating plate column) 60 to produce an organic stream comprising solvent and purified polycarbonate.

Figure 7:
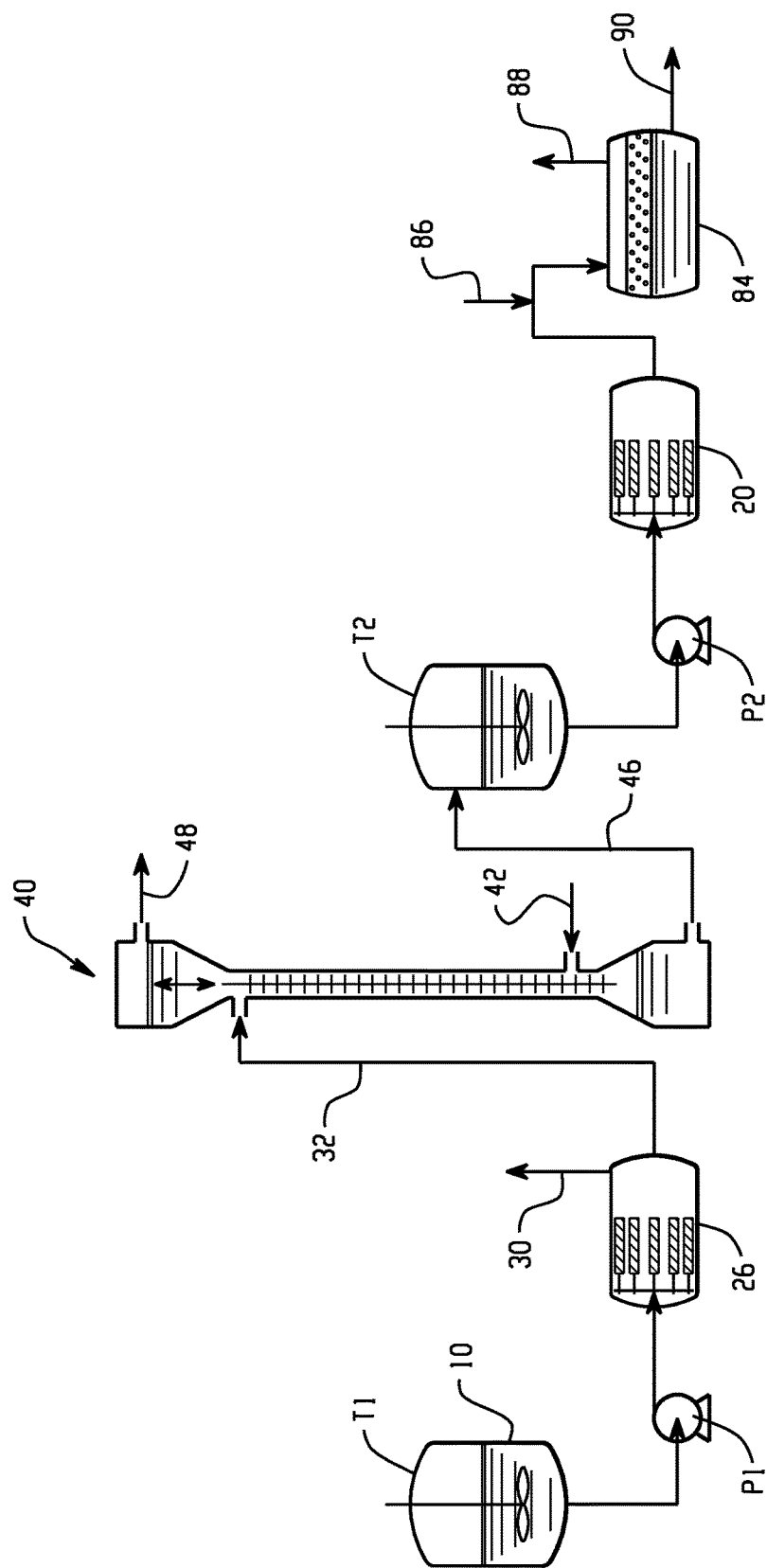
FIG. 7 is a schematic diagram of a purification process utilizing a low shear coalescer, a low shear separation coalescer, a low shear separation column, and a low shear decanter.

FIG. 7 illustrates that separation of the aqueous phase and the organic phase can occur by introducing a product mixture 10 comprising an aqueous and an organic phase via a pump P1 from a tank T1 into an optional low shear rate separating coalescer 26, where the aqueous phase can leave the low shear rate separating coalescer 26 as a purified aqueous stream 30. The separated, reduced ion organic stream 32 can leave the low shear rate separating coalescer 26 and can be introduced to a low shear rate catalyst extraction column 40. As described in FIG. 1, the separated organic stream 32 can enter the low shear rate catalyst extraction column 40 at the top of the column and can leave with a reduced catalyst concentration at the bottom of the column as reduced catalyst, reduced ion organic stream 46. The reduced catalyst, reduced ion organic stream 46 can be directed to optional tank T2 and then pumped into a second optional low shear rate coalescer 20 as shown via a pump P2. The organic stream can then be combined with a water stream 86 and can be introduced to a low shear rate decanter 84 to remove residual catalyst and ions. An aqueous stream comprising the ions 88 (an ion rich stream) can be removed by low shear rate decanter 84 to result in purified resin stream 90.

The process as disclosed herein can produce aqueous and organic streams having good separation, and in particular a separated, extracted organic stream having good separation as defined above, even in interfacial polymerization product mixtures prone to emulsification. Because the tendency to form an emulsion differs for different product mixtures (depending, e.g., on reaction conditions or type of polycarbonates (e.g., homopolymer vs. copolymer), it can be advantageous to determine the tendency to form an emulsion prior to using low shear rate processes described herein. Thus, if an interfacial polymerization product mixture comprising an aqueous phase and an organic phase emulsifies at a high shear rate, reduced carryover and improved product quality can be obtained using the low shear rate processes described herein. Alternatively, standard high shear processes can optionally be employed in whole or in part. A method for determining tendency to emulsify at high shear rates can comprise treating a sample of an interfacial polymerization product mixture at a high shear rate, e.g., 200,000 $S^{-1}$ for a period of time (for example, greater than 60 minutes or longer), and any tendency for emulsification can be determined by visual inspection or by separation of the organic phase and measurement of the size of aqueous droplets emulsified therein. For example, aqueous droplets having an average diameter of less than 200 micrometers, less than 100 micrometers, less than 50 micrometers, less than 25 micrometers, or less than 10 micrometers indicate a tendency for the product mixture to emulsify during separation and extraction of the organic phase. Likewise, organic droplets having an average diameter of less than 200 micrometers, for example, less than or equal to 100 micrometers, specifically, less than or equal to 50 micrometers, more specifically, less than or equal to 25 micrometers, and even more specifically, less than or equal to 10 micrometers, indicate a tendency for the product mixture to emulsify during separation and extraction of the organic phase.

The process can comprise a high shear process, for example, an interfacial polycarbonate product mixture comprising an aqueous phase and an organic phase can be separated by a high shear process using, e.g., a disc centrifuge; and a feed comprising an emulsion (the cream) from the separation is separated in a low shear process, for example, by a low shear centrifuge.

An interfacial polycarbonate product mixture comprising an aqueous phase and an organic phase can be separated, for example, by a high shear process using, e.g., a disc centrifuge to form a separated aqueous phase and a separated organic phase; catalyst can be extracted from the separated organic phase; and a feed comprising an emulsion (the cream) from the separation, the catalyst extraction, or both, can be separated in a low shear process, for example, by a low shear centrifuge.

An interfacial polycarbonate product mixture comprising an aqueous phase and an organic phase can be separated, for example, by a high shear process using, e.g., a disc centrifuge to form a separated aqueous phase and a separated organic phase; catalyst can be extracted from the separated organic phase to provide a purified organic phase; ions can be extracted from the purified organic phase to provide a product organic phase; and a feed comprising an emulsion (the cream) from the separation, the catalyst extraction, the ion extraction, or a combination comprising at least one of the foregoing, can be separated in a low shear process, for example, by a low shear centrifuge.

An interfacial polycarbonate product mixture comprising an aqueous phase and an organic phase can be separated and catalyst can be extracted, for example, by a high shear process using, e.g., a disc centrifuge to provide a separated aqueous phase and a separated organic phase; ions can be extracted from the separated organic phase to provide a product organic phase; and a feed comprising an emulsion (the cream) from the separation and catalyst extraction, the ion extraction, or a combination comprising at least one of the foregoing, is separated in a low shear process, for example, by a low shear centrifuge.

An interfacial polycarbonate product mixture comprising an aqueous and an organic phase can be separated, for example, by a high shear process using, e.g., a disc centrifuge to form a separated aqueous phase and a separated organic phase; catalyst and ions are simultaneously extracted from the separated organic phase to provide a product organic phase; and a feed comprising an emulsion (the cream) from the separation, the catalyst and ion extraction, or both, can be separated in a low shear process, for example, by a low shear centrifuge.

An organic wash stream can be generated during or after an interfacial polycarbonate polymerization that can comprise a water-extractable species; the organic wash stream can be contacted with an aqueous phase (forming a feed stream) to extract the water-extractable species; and the organic phase and the aqueous phase can be separated. The extraction and separation can be carried out using a low shear process, for example, by a low shear centrifuge. Alternatively, a feed comprising an emulsion arising from the extracting or separating can be separated by a low shear process, for example by a low shear centrifuge.

Separation (and any concomitant extraction) of the feed in any of the above embodiments can be accomplished utilizing a low-shear separation method, for example, a method where the feed to be separated is subjected to at least one of an energy of less than or equal to 0.5 kJ/kg of feed; a shear rate of less than less than 150,000 $S^{-1}$, specifically, a shear rate of 0.5 to 100,000, more specifically, a shear rate of 0.5 to 1,000 $S^{-1}$; and a centrifugal force that of 100 to 2,000 g-force, specifically, 100 to 1,000 g-force, more specifically, 500 to 800 g-force.

Separation can occur via a low shear centrifuge where separation is achieved without the use of one or more rotating discs or a rotating screw. The low shear centrifuge can be a CINC™ centrifuge. A motor can be located on the top of the low shear centrifuge and can be connected to the rotor with a flexible coupling. The low shear centrifuge can comprise a metal housing and two inlet and outlet ports. If the phases to be separated are already mixed (such as during an initial separation of the aqueous and organic phases), then only one of the inlets needs to be used. If two different liquids are to enter the low shear centrifuge (such as a separated organic phase and a cleaning stream) then the liquids can enter the low shear centrifuge as separate liquids through the two separate inlets. Likewise, the two liquids can be premixed and can enter through one or both of the inlets. The entering stream(s) can be homogenized in an annular mixing zone and can be directed to the outlets by vanes, for example, in the bottom of the low shear centrifuge toward the outlets. In order to further reduce the shear imparted on the mixture, a low shear sleeve can be installed in the low shear centrifuge to limit contact with the rotor. A self-pumping rotor can move the fluids axially up its diameter, separating the fluids with centrifugal forces that can be 100 to 2,000 g-force, specifically, 100 to 1,000 g-force, more specifically, 500 to 1,000 g-force. The low shear centrifuge can separate an aqueous phase from an organic phase where the aqueous phase can exit the low shear centrifuge through a first outlet and the organic phase can exit through a second outlet. The phases can be fed to the outlets due to gravitational forces. For a given pair of liquids, separation can be improved by optimizing rotor speed, feed rate, and weir size.

The separation as described above can result in the formation of little to no emulsion and ultimately in good separation of an aqueous phase and an organic phase. Good separation can mean less than or equal to 10 vol %, specifically, 0 to 10 vol %, more specifically, 0 to 7 vol %, more specifically, 0 to 5.5 vol %, and even more specifically, 0 to 2 vol % of organic phase in a separated aqueous phase and/or aqueous phase in a separated organic phase exiting the low shear centrifuge. In other words, the low shear centrifuge can separate an organic phase and an aqueous phase, such that there is less than or equal to 10 vol %, specifically, less than or equal to 2 vol % of an organic phase carryover present in the resultant aqueous phase or less than or equal to 1 vol %, specifically, a non-detectable amount by Karl-Fischer analysis (e.g., ASTM E203-08) of an aqueous phase carryover can be present in the resultant organic phase. The improved separation results in one or more of a higher purity product, an increased yield, lower organic solvent in the aqueous phase, or higher efficiencies.

Polycarbonates manufactured and purified as described herein are suitable for use in a wide variety of compositions and applications as is known in the art. Thus, an additive composition can be added to the purified polycarbonate form a polycarbonate composition. The additive composition can one or more additives selected to achieve a desired property, with the proviso that the additive(s) are also selected so as to not significantly adversely affect a desired property of the thermoplastic composition. The additive composition or individual additives can be mixed at a suitable time during the mixing of the components for forming the composition. The additive can be soluble and/or non-soluble in polycarbonate.

The additive composition can include an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, flame retardant, anti-drip agent (e.g., a PTFE-encapsulated styrene-acrylonitrile copolymer (TSAN)), or a combination comprising one or more of the foregoing. For example, a combination of a heat stabilizer, mold release agent, and ultraviolet light stabilizer can be used. In general, the additives are used in the amounts generally known to be effective. For example, the total amount of the additive composition (other than any impact modifier, filler, or reinforcing agent) can be 0.001 to 10.0 wt %, or 0.01 to 5 wt %, each based on the total weight of the polymer in the composition.

Heat stabilizer additives include organophosphites (e.g., triphenyl phosphite, tris-(2,6-dimethylphenyl)phosphite, tris-(mixed mono- and di-nonylphenyl)phosphite or the like), phosphonates (e.g., dimethylbenzene phosphonate or the like), phosphates (e.g., trimethyl phosphate, or the like), or combinations comprising at least one of the foregoing heat stabilizers. The heat stabilizer can be tris(2,4-di-t-butylphenyl) phosphate available as IRGAPHOS™ 168. Heat stabilizers are generally used in amounts of 0.01 to 5 wt %, based on the total weight of polymer in the composition.

There is considerable overlap among plasticizers, lubricants, and mold release agents, which include, for example, glycerol tristearate (GTS), phthalic acid esters (e.g., octyl-4,5-epoxy-hexahydrophthalate), tris-(octoxycarbonylethyl) isocyanurate, tristearin, di- or polyfunctional aromatic phosphates (e.g., resorcinol tetraphenyl diphosphate (RDP), the bis(diphenyl) phosphate of hydroquinone and the bis(diphenyl) phosphate of bisphenol A); poly-alpha-olefins; epoxidized soybean oil; silicones, including silicone oils (e.g., poly(dimethyl diphenyl siloxanes); esters, for example, fatty acid esters (e.g., alkyl stearyl esters, such as, methyl stearate, stearyl stearate, and the like), waxes (e.g., beeswax, montan wax, paraffin wax, or the like), or combinations comprising at least one of the foregoing plasticizers, lubricants, and mold release agents. These are generally used in amounts of 0.01 to 1 wt %, based on the total weight of the polymer in the composition.

Light stabilizers, in particular ultraviolet light (UV) absorbing additives, also referred to as UV stabilizers, include hydroxybenzophenones (e.g., 2-hydroxy-4-n-octoxy benzophenone, commercially available under the trade name CYASORB 531 from Cytec), hydroxybenzotriazines (e.g., 2-[4,6-bis(2,4-dimethylphenyl)-1,3,5-triazin-2-yl]-5-(octyloxy)-phenol, commercially available under the trade name CYASORB 1164 from Cytec), cyanoacrylates (e.g., 1,3-bis [(2-cyano-3,3-diphenylacryloyl)oxy]-2,2-bis[[(2-cyano-3,3-diphenylacryloyl)oxy]methyl]propane, commercially available under the trade name UVINUL 3030), oxanilides, benzoxazinones (e.g., 2,2'-(1,4-phenylene)bis(4H-3,1-benzoxazin-4-one, commercially available under the trade name CYASORB UV-3638 from Cytec), aryl salicylates, hydroxybenzotriazoles (e.g., 2-(2-hydroxy-5-methylphenyl)benzotriazole, 2-(2-hydroxy-5-tert-octylphenyl)benzotriazole, and 2-(2H-benzotriazol-2-yl)-4-(1,1,3,3-tetramethylbutyl)phenol, commercially available under the trade name CYASORB 5411 from Cytec), inorganic materials such as titanium oxide, cerium oxide, and zinc oxide, all with particle size less than or equal to 100 nanometers, or combinations comprising at least one of the foregoing light stabilizers. The UV stabilizers can be present in an amount of 0.01 to 1 wt %, specifically, 0.1 to 0.5 wt %, and more specifically, 0.15 to 0.4 wt %, based upon the total weight of polymer in the composition.

The polycarbonate compositions can be manufactured by various methods known in the art. For example, powdered polycarbonate, and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat and/or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

Shaped, formed, or molded articles comprising the polycarbonate compositions are also provided. The polycarbonate compositions can be formed into useful shaped articles by a variety of methods such as extrusion, calendaring, molding (e.g., injection molding, rotational molding, blow molding, compression molding), thermoforming, and combinations comprising at least one of these methods. Some examples of articles include computer and business machine housings such as housings for monitors, handheld electronic device housings such as housings for cell phones, electrical connectors, and components of lighting fixtures (e.g., luminaires, headlights, and so forth), ornaments, home appliances, roofs, greenhouses, sun rooms, swimming pool enclosures, medical devices, containers (e.g., food containers), and the like.

The following examples illustrate the low shear purification of an interfacial reaction mixture comprising an aqueous phase and an organic phase. The examples are merely illustrative and are not intended to limit devices made in accordance with the disclosure to the materials, conditions, or process parameters set forth therein.

EXAMPLES

Figure 8:
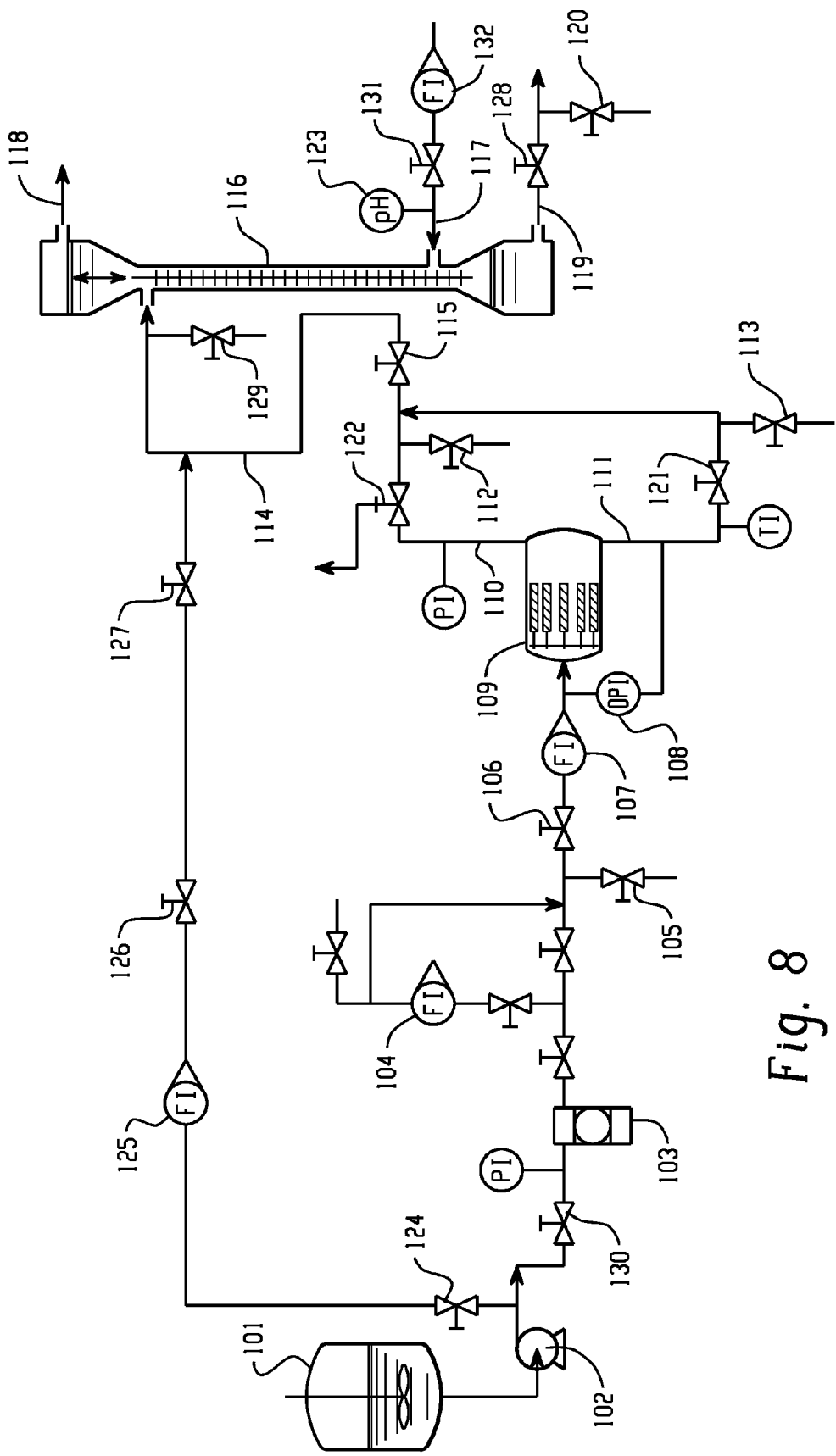
FIG. 8 is a schematic diagram of the purification process utilized in the Examples 1-15.

A schematic diagram of the purification process utilized in the following examples is illustrated in FIG. 8. Specifically, a pump 102 was used to supply a previously separated organic phase that comprised a BPA-PPPBP copolycarbonate (made by interfacial polymerization, and sourced from SABIC's Innovative Plastics business), dichloromethane, water droplets, and residual catalyst and ions to the low shear rate purification system from supply tank 101. The low shear rate separation system comprised a pre-filtering unit 103, a low shear rate separating coalescer 109 and associated flow control and measurement instrumentation 112, 113, 115, 121, 122, 124, 126, and 127. The pre-filtering unit 103 was used to remove particulates and to help protect the coalescing cartridge from damage. Two rotameters 104 and 107 were used to measure flow rate. Flow was controlled with needle valve 106. Sampling point 105 was the sampling point of the inlet stream. Differential pressure gauge 108 allowed for the measurement of pressure drop across the coalescer. The two streams leaving the coalescer were aqueous stream 110 and a purified resin stream 111 that could be sampled at sampling points 112 and 113, respectively. The aqueous stream 110 could be removed via valve 122. When the low shear rate separating coalescer 109 was run with the downstream positioned low shear rate extraction column (a reciprocating plate column) 116, aqueous stream 110 was diverted and stream 114 was directed to the low shear rate extraction column 116.

Either a low pH aqueous stream (for interfacial catalyst removal) or water (for residual ion removal), namely, cleaning stream 117, was introduced at the bottom of the low shear rate extraction column (a reciprocating-plate column) and removed at the top as an impurity-rich aqueous stream 118. The flow rate of the cleaning stream was controlled using needle valve 131 and measured with rotameter 132. Organic stream 114 was introduced at the top of the column and exited at the bottom as purified organic stream 119 that could be sampled at sampling point 120.

The equipment used in the purification process as illustrated in FIG. 8 is described in Table 1.

TABLE 1

| Name | Key specifications |
|---|---|
| Coalescing cartridge (109) | PALL PhaseSep A/S Series<br>Nominal length: 6 inches (in) (15.2 centimeters (cm)) |
| Pre-filter (103) | PALL Profile A/S Series (RLS FPS 100)<br>Filter medium: Polyphenylene Sulfide<br>99.98% removal at 10 micrometer particulate size |
| Reciprocating-plate column (116) | Pyrex glass column<br>2 in (5.1 cm) diameter; 10 feet (ft) (3.1 meter (m)) height<br>Internals consist of 316SS plates<br>Plates are perforated (9/16 in (1.4 cm) openings, 55% open area)<br>Plates spacing 2 in (5.1 cm)<br>Strokes length 3/4 in (1.9 cm)<br>Motor is 1/4 horsepower (186 watts) |
| Pump (102) | Waukesha Model 18U2<br>Rotary lobe pump<br>1 horsepower (746 watts) motor<br>175 ft (53.3 m) total dynamic head |
| Storage tank (101) | Capacity: 300 gallons (1.1 cubic meters) |

The polycarbonate concentration in solvent was determined thermo-gravimetrically and is reported as weight percent of the total organic phase.

Chloride concentration in the polycarbonate solution was determined by titration and is reported as parts per million based on dry polycarbonate mass (solvent excluded) (ppm).

Concentration of interfacial catalyst (triethylamine, TEA) in the organic phase was determined by ultraviolet-visible spectroscopy and is reported as parts per million based on dry polycarbonate mass (solvent excluded).

Examples 1-5: Ion Extraction Via a Low Shear Separating Coalescer

In Examples 1-5, chloride ions were extracted from BPA-PPPBP copolycarbonate solutions of varying copolycarbonate concentration using the low shear separating coalescer 109. In order to direct the polycarbonate solution to the coalescer and to prevent it from entering the extraction column, valves 124, 126, and 127, as well as 115, were closed. During startup, needle valves 130 and 106 were opened, and valve 121 was initially closed while valve 122 was fully opened (to allow removal of aqueous stream 110), and the organic phase was allowed to fill the coalescer. When aqueous stream 110 was observed, the flow rate of the copolycarbonate solution into the coalescer was adjusted to values as shown in Table 2 using needle valve 106. The flow rate of the aqueous stream 110 and the purified resin stream 111 were adjusted manually using valves 122 and 121, respectively. After one hour, samples were taken at sampling points 105, 112, and 113. The results are shown in Table 2.

TABLE 2

| Example No. | 1 | 2 | 3 | 4 | 5 |
|---|---|---|---|---|---|
| Copolycarbonate concentration in organic phase (wt %) | 7.3 | 6.6 | 6.2 | 9.5 | 11.2 |
| Copolycarbonate solution flow rate (gallons per minute) | 0.03 | 0.1 | 0.24 | 0.45 | 0.05 |
| Copolycarbonate solution flow rate (liters per minute) | 0.11 | 0.38 | 0.91 | 1.70 | 0.19 |
| Chloride concentration in inlet stream sampled at 105 (ppm) | 344 | 3128 | 2320 | 150 | 368 |
| Chloride concentration in outlet stream sampled at 113 (ppm) | 13.2 | 1.7 | 72 | 23 | 60 |
| Chloride removed (%, based on ppm) | 96.1 | 99.9 | 96.9 | 84.7 | 83.7 |

Table 2 shows that the percentage of chlorides removed varied between 83.7% and 99.9%. For all examples, phase separation was complete and there was no phase carryover present in the organic phase.

Examples 6-10: Ion Extraction Via a Low Shear Rate Coalescer and an Extraction Column In Examples 6-10, chloride ions were extracted from BPA-PPPBP copolycarbonate solutions of varying copolycarbonate concentration using a low shear rate separating coalescer 109 and low shear rate extraction column 116. Flow was directed through the purification system by closing valves 124, 126, and 127 and opening valves 130, 106, and 115. Flow was then directed through the low shear rate separating coalescer 109 as described in Examples 1-5. Purified (reduced ion) resin stream 111 was then introduced to the top of the low shear extraction column 116, while aqueous stream 110 was removed from the system via valve 122. A water cleaning stream 117 was introduced to the bottom of the low shear extraction column and exited the column as an impurity-rich aqueous stream 118. Needle valve 131 and rotameter 132 were used to set the water flow rate. After one hour, samples were taken at sampling points 105 and 120. The results are shown in Table 3.

TABLE 3

| | 6 | 7 | 8 | 9 | 10 |
|---|---|---|---|---|---|
| Copolycarbonate concentration in organic phase (wt %) | 7.1 | 6.7 | 7.1 | 7.2 | 8 |
| Copolycarbonate solution flow rate (gallons per minute) | 0.053 | 0.079 | 0.079 | 0.079 | 0.026 |
| Copolycarbonate solution flow rate (liters per minute) | 0.20 | 0.30 | 0.30 | 0.30 | 0.10 |
| Water flow rate at 117 (gallons per minute) | 0.16 | 0.24 | 0.24 | 0.24 | 0.08 |
| Water flow rate (liters per minute) | 0.61 | 0.91 | 0.91 | 0.91 | 0.30 |
| Chloride concentration in inlet stream sampled at 105 (ppm) | 345 | 230 | 10.1 | 43.5 | 49.8 |
| Chloride concentration in outlet stream 119 (ppm) | 12.5 | 14.4 | 1 | 0.4 | 1.8 |
| Percent chloride removed (based on ppm) | 96.4 | 93.8 | 89.7 | 99.2 | 96.4 |

Table 3 shows that the percent of chloride removed varied between 89.7% and 99.2%. Energy input in the low shear rate extraction column 116 was not measured during the separation but estimated using correlation available in the literature to be in the range from 0.2 to 0.6 watts per kilogram. For all examples, phase separation was complete and there was no phase carryover present.

Examples 11-15: Catalyst Extraction Via an Extraction Column

In Examples 11-15, interfacial catalyst (TEA) used to polymerize the polycarbonate was extracted from BPA-PPPBP copolycarbonate solutions of varying copolycarbonate concentration using the low shear rate extraction column 116. In order to direct the organic phase to the column, valves 124, 126, and 127 were opened and valve 300 was closed. The flow rate into the column was set using needle valve 126 and rotameter 125. An acid cleaning stream 117 was introduced to the bottom of the low shear rate extraction column 116 and exited the column as an aqueous impurity-rich stream 118. The pH of the acid cleaning stream 117 was monitored using a pH meter 123 and was maintained from 1 to 1.5. Needle valve 131 and rotameter 132 were used to set acid solution flow rate. After one hour, samples were taken at sampling points 120 and 129. The results are shown in Table 4.

TABLE 4

| Example | 11 | 12 | 13 | 14 | 15 |
|---|---|---|---|---|---|
| Copolycarbonate concentration in organic phase (wt %) | 11 | 7.7 | 7.4 | 8 | 8.4 |
| Copolycarbonate solution flow rate (gallons per minute) | 0.026 | 0.053 | 0.058 | 0.079 | 0.11 |
| Copolycarbonate solution flow rate (liters per minute) | 0.10 | 0.20 | 0.22 | 0.30 | 0.42 |
| Acid flow rate (gallons per minute) | 0.08 | 0.16 | 0.16 | 0.23 | 0.04 |
| Acid flow rate (liters per minute) | 0.30 | 0.61 | 0.61 | 0.87 | 0.15 |
| TEA concentration in inlet stream (solution from tank 100), ppm | 226 | 120 | 192 | 179 | 98.8 |
| TEA concentration in outlet stream 190, ppm | 50.2 | 4.8 | 22.1 | 6 | 0 |
| Percent of TEA removed (based on ppm) | 77.8 | 96 | 88.5 | 96.7 | 100 |

Table 4 shows that the percent of TEA removed varied between 77.8% and 100%. Energy input in the reciprocating plate column was in the range from 0.002 to 1.4 watts per kilogram feed. For all examples, phase separation was complete and there was no phase carryover present.

Examples 16-31

Figure 9:
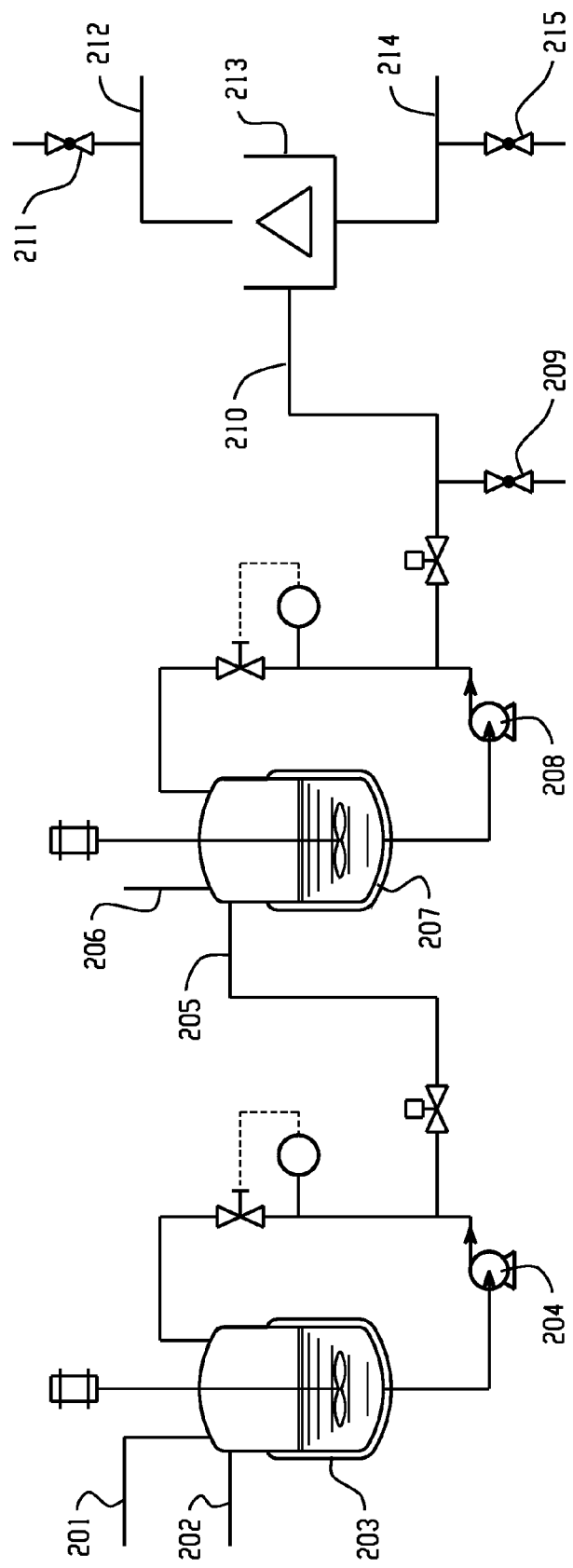
FIG. 9 is a schematic diagram of the process used in Examples 16-31.

FIG. 9 illustrates the pilot apparatus used in the below examples, where the low shear centrifuge 213 was a V10 TA/CIP CINC™ centrifuge obtained from CINC Industries. Specifically, polymer powder 201 was mixed with a solvent stream 202 of methylene chloride and agitated in a mixing tank 203 for a minimum of two hours to ensure complete dissolution. When solvent stream 202 comprised a polymer, polymer powder 201 was not necessarily added. Water stream 206 was mixed with polymer stream 205 and fed to emulsification tank 207 via pump 204. The emulsification tank 207 provided vigorous agitation to the two phases to result in an emulsified mixture, where additional mixing was provided by pump 208. As some phase separation in emulsification tank 207 could have been possible, which would have resulted in an inconsistency of feed water to organic ratio, the consistency of the emulsion was carefully monitored for the duration of the trial to ensure that this did not happen. The resulting emulsion stream 210 was sampled at sampling point 209 and was pumped to the low shear centrifuge 213. The low shear centrifuge 213 separated the emulsion into two streams: separated aqueous stream 212 that could be sampled at sampling point 211 and separated organic stream 214 that could be sampled at sampling point 215. Sampling of emulsion stream 210, separated aqueous stream 212, and separated organic stream 214 was performed simultaneously at sampling points 209, 211, and 215, respectively.

Mixing tank 203 had a capacity of 300 gallons (gal) and emulsification tank 207 had a capacity of 500 gal. Pump 204 was a rotary lobe pump rated for 1 horsepower (hp) (0.7 kilowatt (kW)) and pump 208 was a centrifugal pump rated for 7.5 hp (5.5 kW). The specific gravity of the polymer solutions leaving the mixing tank 203 was 1.25 to 1.35. In all the examples below, creaming refers to a volumetric amount of organic phase carryover in aqueous phase. A creaming of less than 2 volume percent (vol %) is considered low and it means that good separation was achieved, a creaming of 2 to 10 vol % is called moderate and means the separation is acceptable in most circumstances, and a creaming of greater than 10 vol % is considered heavy and is unacceptable for many process designs.

Examples 16 to 24: BPA Homopolymer Emulsion Separation

For Examples 16 to 24, dry polycarbonate (total volatiles <0.5 wt %) powder, comprising a homopolymer of BPA having a weight average molecular weight in the range of 29,000 to 31,000 grams per mole (g/mol) was added, in addition to a solvent stream 202 of dichloromethane to mixing tank 203. The results are shown in Tables 5 and 6, where the polymer stream 205 used in Examples 16 to 19 had a viscosity of 5 to 20 cP and 5 to 6 wt % of solids, and the polymer stream 205 in Examples 20 to 24 had a viscosity of 100 to 150 cP and 11.0 to 11.4 wt % of solids. In the tables, rpm refers to revolutions per minute, cm refers to centimeters, lb/min refers to pounds per minute, kg/min refers to kilograms per minute, and vol/vol refers to volume of water (W) per volume of organics (O).

TABLE 5

| Example | 16 | 17 | 18 | 19 |
|---|---|---|---|---|
| Feed rate [lb/min (kg/min)] | 40 (18.1) | 40 (18.1) | 30 (13.6) | 30 (13.6) |
| Feed W/O, (vol/vol) | 0.7 | 0.8 | 0.7 | 0.6 |
| rpm | 2700 | 2700 | 2700 | 2700 |
| Weir size [in (cm)] | 5.2 (13.2) | 5.2 (13.2) | 5.2 (13.2) | 5.2 (13.2) |
| Organic phase carryover in separated aqueous stream 12 (vol %) | 4.00 | 14.90 | 10.30 | 6.30 |
| Aqueous phase carryover in separated organic stream 14 (vol %) | Nd | Nd | Nd | Nd |
| Solids in organic phase (wt %) | 5.60 | 5.70 | 5.60 | 5.70 |

Table 5 shows that when the viscosity of the organic solution increases, the organic phase carryover in the aqueous phase also increases. It is also clear that creaming is mostly moderate at the conditions studied.

TABLE 6

| Example | 20 | 21 | 22 | 23 | 24 |
|---|---|---|---|---|---|
| Feed rate [lb/min (kg/min)] | 30 (13.6) | 30 (13.6) | 20 (9.1) | 40 (18.1) | 40 (18.1) |
| Feed W/O, (vol/vol) | 30 | 30 | 20 | 40 | 40 |
| rpm | 2700 | 2700 | 2700 | 2700 | 2700 |
| Weir size [in (cm)] | 5.1 (13.0) | 5.1 (13.0) | 5.1 (13.0) | 5.1 (13.0) | 5.1 (13.0) |
| Organic phase carryover in separated aqueous stream 12 (vol %) | 33.10 | 29.20 | 13.20 | 28.90 | 31.50 |
| Aqueous phase carryover in separated organic stream 14 (vol %) | <1 | <1 | <1 | <1 | <1 |
| Solids in organic phase (wt %) | 11.20 | 11.30 | 11.30 | 11.00 | 11.40 |

Table 6 shows that when the viscosity of organic phase is high, specifically, 100 to 150 cP, then heavy creaming was observed, where all but one of the examples resulted in an organic phase carryover in the separated aqueous stream 212 of greater than 28 vol % and all of the examples resulted in a detectable amount of aqueous phase carryover in the separated organic stream 214.

Examples 25 to 31: BPA/PPPBP Copolymer Emulsion Separation

For Examples 25 to 31, a polymer powder 201 of a dry high heat polycarbonate (total volatiles <0.5 wt %) was added, in addition to a solvent stream 202 of dichloromethane to mixing tank 203. The high heat polycarbonate was a copolymer of BPA and PPPBP (manufactured by interfacial polymerization, and sourced from SABIC's Innovative Plastics division). It is noted that a solution comprising the BPA-PPPBP copolymer in dichloromethane has a much higher tendency to emulsify when mixed with water and is consequently more difficult to separate using conventional disc type centrifuges than a BPA homopolymer, where the time it takes to break an emulsion of BPA-PPPBP copolymer as compared to a BPA homopolymer emulsion is two orders of magnitude longer than under identical conditions. The results are shown in Tables 7 and 8, where the polymer stream 205 used in Examples 25 to 27 had viscosity of 3 to 10 cP and the polymer stream 205 in Examples 28 to 31 had a viscosity of 25 to 75 cP.

TABLE 7

| Example | 25 | 26 | 27 |
|---|---|---|---|
| Feed rate [lb/min (kg/min)] | 40 (18.1) | 40 (18.1) | 30 (13.6) |
| Feed W/O, (vol/vol) | 1.1 | 1.3 | 1.2 |
| rpm | 2700 | 2700 | 2700 |
| Weir size [in (cm)] | 5.1 (13.0) | 5.1 (13.0) | 5.1 (13.0) |
| Organic phase carryover in separated aqueous stream 12 (vol %) | 3.70 | 0.50 | 3.20 |
| Aqueous phase carryover in separated organic stream 14 (vol %) | <1 | <1 | <1 |
| Solids in organic phase (wt %) | 5.00 | 5.20 | 5.30 |

Table 7 shows that low to moderate creaming was observed for all of Examples 25-27, where this level of creaming is acceptable for many commercial applications. Table 7 further shows that such low shear centrifuges can provide an economical way to separate an emulsified aqueous phase coming out of a BPA/PPPBP purification process that employs disc type centrifuges where the creaming volume fraction is typically in the range of 5 to 40 vol %. A solvent such as dichloromethane can be added to emulsified aqueous phase to lower the viscosity to, for example, less than or equal to 10 cP to decrease the creaming amount and to further improve separation.

TABLE 8

| Example | 28 | 29 | 30 | 31 |
|---|---|---|---|---|
| Feed rate [lb/min (kg/min)] | 40 (18.1) | 40 (18.1) | 30 (13.6) | 30 (13.6) |
| Feed W/O, (vol/vol) | 1 | 1 | 1 | 1 |
| rpm | 2700 | 2700 | 2700 | 2700 |
| Weir size [in (cm)] | 5.1 (13.0) | 5.1 (13.0) | 5.1 (13.0) | 5.1 (13.0) |
| Organic phase carryover in separated aqueous stream 12 (vol %) | 40.80 | 41.90 | 33.50 | 28.00 |
| Aqueous phase carryover in separated organic stream 14 (vol %) | <1 | <1 | <1 | <1 |
| Solids in organic phase (wt %) | 10.10 | 10.50 | 10.70 | 11.10 |

Table 8 shows that a high creaming was observed for all of Examples 28 to 31 that had organic phase viscosities of 25 to 75 cP, where the creaming was greater than or equal to 28.00 vol %. This level of creaming is generally not acceptable for many commercial applications.

Examples 32-42: Off-Grade Methylene Chloride Emulsion Separation

FIG. 9 also illustrates the pilot apparatus used in the below examples, where the low shear centrifuge 213 used was a V10 TA/CIP CINC™ centrifuge obtained from CINC Industries. Specifically, polymer powder 201 was mixed with a solvent stream 202 of methylene chloride and agitated in a mixing tank 203 for a minimum of two hours to ensure complete dissolution. Likewise, when solvent stream 202 comprised a polymer, polymer powder 201 was not necessarily added. A pump 204 was used to pump the polymer stream 205 that was mixed with water stream 206 and fed to In Examples 32 to 42, solvent stream 202 comprised methylene chloride ("MeCl$_2$" (dichloromethane)) and 0.2 wt % of dissolved solids (also referred to as "off-grade MeCl$_2$"). The dissolved solids comprised degraded homopolymer of BPA, residual monomers, ionic impurities, 0 to 1,000 parts per million by weight (ppm) of dissolved catalysts such as tri-ethyl aluminum (TEA), and the like. The viscosity of off-grade MeCl$_2$ was less than or equal to 10 cP, specifically, less than or equal to 5 cP. Off-grade MeCl$_2$ can be obtained by using recycle MeCl$_2$, which does not have any measurable dissolved solids for hood flushes on disc type centrifuges or for flushing equipment used in a variety of unit operations. A total of 200 gallons of off-grade MeCl$_2$ was added as solvent stream 202 to mixing tank 203 and mixed.

TABLE 9

| Example | 32 | 33 | 34 | 35 | 36 | 37 | 38 | 39 | 40 | 41 | 42 |
|---|---|---|---|---|---|---|---|---|---|---|---|
| Feed rate (lb/min) | 30 | 50 | 50 | 40 | 40 | 48 | 48 | 48 | 30 | 30 | 30 |
| Feed rate (kg/min) | 13.6 | 22.7 | 22.7 | 18.1 | 18.1 | 21.8 | 21.8 | 21.8 | 13.6 | 13.6 | 13.6 |
| Feed W/O, (vol/vol) | 1.2 | 0.7 | 0.2 | 0.9 | 0.9 | 1 | 0.2 | 3 | 3 | 1 | 0.2 |
| Rpm | 2700 | 2700 | 2700 | 2700 | 2700 | 2700 | 2475 | 2475 | 2475 | 2025 | 2475 |
| Weir size (in) | 5.1 | 5.1 | 5.1 | 5.2 | 5.2 | 4.7 | 4.7 | 4.7 | 4.7 | 4.7 | 4.7 |
| Weir size (cm) | 13.0 | 13.0 | 13.0 | 13.2 | 13.2 | 11.9 | 11.9 | 11.9 | 11.9 | 11.9 | 11.9 |
| Organic phase carryover in separated aqueous stream 12[1] (vol %) | 0.10 | 0.06 | 0.12 | 0.29 | 4.42 | 3.10 | 1.20 | 6.00 | 0.50 | 3.00 | 1.40 |
| Aqueous phase carryover in separated organic stream 14[2] (vol %) | Nd[3] | Nd | Nd | Nd | Nd | Nd | Nd | Nd | Nd | Nd | Nd |

[1]As used herein, reported organic phase carryover value is a volume percent calculated by dividing the vol of the organic phase carryover by the sum of the volumes of the organic phase carryover and the volume of the separated aqueous phase.
[2]As used herein, reported aqueous phase carryover value is a volume percent calculated by dividing the vol of the aqueous phase carryover by the sum of the volumes of the aqueous phase carryover and the volume of the separated organic phase.
[3]As used herein, "Nd" is non-detectable.

emulsification tank 207. The emulsification tank 207 provided vigorous agitation to the two phases to result in an emulsified mixture, where additional mixing was provided by pump 208. As some phase separation in emulsification tank 207 could have been possible, which would have resulted in an inconsistency of feed water to organic ratio, the consistency of the emulsion was carefully monitored for the duration of the trial to ensure that this did not happen. The resulting emulsion stream 210 was sampled at sampling point 209 and was pumped to the low shear centrifuge 213. The low shear centrifuge 213 separated the emulsion into two streams: separated aqueous stream 212 that could be sampled at sampling point 211 and separated organic stream 214 that could be sampled at sampling point 215. Sampling of emulsion stream 210, separated aqueous stream 212, and separated organic stream 214 was performed simultaneously at sampling points 209, 211, and 215, respectively.

Mixing tank 203 had a capacity of 300 gallons (gal) and emulsification tank 207 had a capacity of 500 gal. Pump 204 was a rotary lobe pump rated for 1 horsepower (hp) (0.7 kilowatt (kW)) and pump 208 was a centrifugal pump rated for 7.5 hp (5.5 kW). The specific gravity of the polymer solutions leaving the mixing tank 203 was 1.25 to 1.35. In all the examples below, creaming refers to a volumetric amount of organic phase carryover in aqueous phase. A creaming of less than 2 vol % is considered low and it means that good separation was achieved, a creaming of 2 to 10 vol % is called moderate and means the separation is acceptable in most circumstances, and a creaming of greater than 10 vol % is considered heavy and is unacceptable for many process designs.

Table 9 shows that good separation of less than 10 vol % carryover of organic phase in the aqueous phase and in many cases, less than 2 vol % was obtained for various combinations of feed rate, centrifugal forces (CINC rpm), and weir sizes. For all the examples, aqueous phase carryover in separated organic phase is not observed. It is noted that a weir size of 5.1 inch (13.0 cm) resulted in little to no carryover in both the separated aqueous stream 212 and the separated organic stream 214.

Set forth below are some embodiments of the process and system for purifying a polycarbonate from an interfacial polymerization product mixture.

Embodiment 1

A process of making a purified polycarbonate comprising: interfacially polymerizing a polycarbonate to form a product mixture; wherein the product mixture comprises an aqueous phase and an organic phase comprising an organic solvent, the polycarbonate, a catalyst, and ions; separating the aqueous phase and the organic phase while subjecting the product mixture to a shear rate of less than 150,000 S$^{-1}$ to form a separated organic phase and a separated aqueous phase; extracting the catalyst from the separated organic phase with an acid stream while subjecting the separated organic phase and the acid stream to a shear rate of less than less than 150,000 S$^{-1}$; and extracting the ions from the separated organic phase with a water stream while subjecting the separated organic phase and the water stream to a shear rate of less than less than 150,000 S$^{-1}$; forming a purified organic phase comprising the purified polycarbonate.

Embodiment 2

A process of purifying a polycarbonate from a feed comprising an interfacial polymerization product mixture, wherein the product mixture comprises an aqueous phase and an organic phase comprising an organic solvent, the polycarbonate, a catalyst, and ions, the process comprising: separating the aqueous phase and the organic phase while subjecting the product mixture to a shear rate of less than 150,000 $S^{-1}$ to form a separated organic phase and a separated aqueous phase; extracting the catalyst from the separated organic phase with an acid stream while subjecting the separated organic phase and the acid stream to a shear rate of less than less than 150,000 $S^{-1}$; and extracting the ions from the separated organic phase with a water stream while subjecting the separated organic phase and the water stream to a shear rate of less than less than 150,000 $S^{-1}$; to form a purified organic phase comprising a purified polycarbonate.

Embodiment 3

The process of any of Embodiments 1-2, wherein one or more of the separating, the extracting of the catalyst, and the extracting of the ions, is at a shear rate of 0.5 to less than 100,000 $S^{-1}$.

Embodiment 4

The process of any of Embodiments 1-3, wherein the extracting of the catalyst occurs prior to or at the same time as the extracting of the ions.

Embodiment 5

The process of any of Embodiments 1-4, wherein one or both of the extracting of the catalyst and the extracting of the ions occurs via a low shear rate separating coalescer, a low shear rate extraction column, a low shear rate decanter, or a combination comprising one or more of the foregoing.

Embodiment 6

A process of purifying an interfacially polymerized polycarbonate from a feed comprising an aqueous phase and an organic phase comprising an organic solvent, the interfacially polymerized polycarbonate, a catalyst, and ions, the process comprising: separating the aqueous phase and the organic phase from the feed, wherein during the separating the feed is subjected to at least one of: energy of less than or equal to 0.5 kJ/kg of feed, a shear rate of less than 150,000 $S^{-1}$, and centrifugal forces of 100 to 2,000 g-force; to form a purified aqueous phase and a purified organic phase comprising a purified polycarbonate.

Embodiment 7

A process of making a purified polycarbonate comprising: interfacially polymerizing a polycarbonate to form a product mixture; wherein the product mixture comprises an aqueous phase and an organic phase comprising an organic solvent, the polycarbonate, a catalyst, and ions; separating the aqueous phase and the organic phase from the product mixture, wherein during the separating the product mixture is subjected to at least one of: an energy of less than or equal to 0.5 kJ/kg of product mixture, a shear rate of less than 150,000 $S^{-1}$, and centrifugal forces of 100 to 2,000 g-force; forming a purified aqueous phase and a purified organic phase comprising the purified polycarbonate.

Embodiment 8

The process of any of Embodiments 6-7, wherein the feed comprises an organic wash stream and wherein the process further comprises extracting the organic wash stream with an extracting aqueous stream prior to the separating.

Embodiment 9

The process of any of Embodiments 6-8, wherein the feed is subjected to the energy of 0.001 to 0.5 kJ/kg of feed.

Embodiment 10

The process of any of Embodiments 6-9, wherein the feed is subjected to the shear rate of 0.5 to less than 100,000 $S^{-1}$.

Embodiment 11

The process of any of Embodiments 1-10, wherein the solvent comprises dichloromethane, dichloroethane, methylene chloride, or a combination comprising one or both of the foregoing.

Embodiment 12

The process of any of Embodiments 1-11, wherein the organic phase has a viscosity of less than or equal to 100 centipoise.

Embodiment 13

The process of any of Embodiments 1-12, wherein the separating occurs via a low shear rate centrifuge, a low shear rate decanter, a low shear rate separating coalescer, or a combination comprising one or more of the foregoing.

Embodiment 14

The process of any of Embodiments 1-13, wherein the separating is at a shear rate of 0.5 to less than 100,000 $S^{-1}$.

Embodiment 15

The process of any of Embodiments 1-14, further comprising increasing a size of an aqueous droplet in the organic phase in a low shear rate coalescer to form a coalesced mixture.

Embodiment 16

The process of Embodiment 15, further comprising adding an acidic aqueous stream to the coalesced mixture to lower a pH of the coalesced aqueous phase to less than or equal to 3.

Embodiment 17

The process of any of Embodiments 1-16, wherein the separated aqueous stream comprises less than or equal to 10 vol % of the organic phase.

Embodiment 18

The process of any of Embodiments 1-17, wherein the separated organic stream comprises less than or equal to 7 vol % of the aqueous phase, preferably less than or equal to 5.5 vol %, and more preferably, less than or equal to 2 vol %.

Embodiment 19

The process of any of Embodiments 1-18, wherein the separated organic phase has a viscosity of less than or equal to 100 centipoise.

Embodiment 20

The process of any of Embodiments 1-19, further comprising isolating polycarbonate from the purified organic phase.

Embodiment 21

The process of any of Embodiments 1-20, further comprising recycling the separated organic phase.

Embodiment 22

The process of any of Embodiments 1-21, wherein the separating comprises separating with a low shear centrifuge.

Embodiment 23

The process of Embodiment 22, wherein the low shear centrifuge is free of a rotating disc and a rotating screw.

Embodiment 24

The process of any of Embodiments 22-23, wherein the process further comprises introducing the feed to an annular mixing zone in the low shear centrifuge.

Embodiment 25

The process of any of Embodiments 22-24, wherein the low shear centrifuge comprises a low shear sleeve.

Embodiment 26

The process of any of Embodiments 22-25, wherein one or both of the purified aqueous phase and the purified organic phase exits the low shear centrifuge due to a gravitational force.

Embodiment 27

The process of any of Embodiments 1-26, wherein the polycarbonate comprises a bisphenol A homopolymer, a copolycarbonate comprising bisphenol A carbonate units and bulky bisphenol carbonate units derived from a bisphenol having at least 12 carbon atoms, or a polyestercarbonate comprising bisphenol A carbonate units and terephthalate-isophthalate acid-bisphenol A ester units.

Embodiment 28

The process of Embodiment 27, wherein the polycarbonate comprises a copolycarbonate comprising bisphenol A carbonate units and 2-phenyl-3,3'-bis(4-hydroxyphenyl) phthalimidine carbonate units, a copolymer comprising bisphenol A carbonate units and 1,1-bis(4-hydroxy-3-methyl-phenyl)cyclohexane carbonate units, and a copolymer comprising bisphenol A carbonate units and isophorone bisphenol carbonate units.

Embodiment 29

The process of any of Embodiments 1-28, further comprising determining that the product mixture emulsifies at shear rate of greater than or equal to 150,000 $S^{-1}$ prior to the separating.

Embodiment 30

The process of any of Embodiments 1-29, further comprising determining that one or both of the separated aqueous phase and the separated organic phase emulsifies at shear rate greater than or equal to 150,000 $S^{-1}$.

Embodiment 31

A system for purifying a polycarbonate from an interfacial polymerization product mixture comprising an aqueous phase and an organic phase comprising an organic solvent, the polycarbonate, a catalyst, and ions, the system comprising: low shear rate separator for separating the aqueous phase and the organic phase from the product mixture that subjects the product mixture to a shear rate of less than 150,000 $S^{-1}$.

Embodiment 32

The system of Embodiment 31, further comprising: a low shear rate catalyst extractor, which is in fluid communication with the low shear rate separator, for extracting the catalyst from a separated organic phase with an acid stream that subjects the separated organic phase and the acid stream to a shear rate of less than 150,000 $S^{-1}$; and a low shear rate ion extractor, which is in fluid communication with the low shear rate catalyst extractor, for extracting ions from the separated organic phase with a water stream that subjects the separated organic phase and the water stream to a shear rate of less than 150,000 $S^{-1}$.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt %, or, more specifically, 5 to 20 wt %", is inclusive of the endpoints and all intermediate values of the ranges of "5 to 25 wt %," etc.). Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or" unless clearly dictated otherwise by context. Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A process of purifying a polycarbonate from a feed comprising an interfacial polymerization product mixture, wherein the product mixture comprises an aqueous phase and an organic phase comprising an organic solvent, the polycarbonate, a catalyst, and ions, the process comprising:
    separating the aqueous phase and the organic phase while subjecting the product mixture to a shear rate of less than 150,000 $S^{-1}$ to form a separated organic phase and a separated aqueous phase;
    extracting the catalyst from the separated organic phase with an acid stream while subjecting the separated organic phase and the acid stream to a shear rate of less than 150,000 $S^{-1}$; and
    extracting the ions from the separated organic phase with a water stream while subjecting the separated organic phase and the water stream to a shear rate of less than 150,000 $S^{-1}$;
    to form a purified organic phase comprising a purified polycarbonate.

2. A process of making a purified polycarbonate, comprising:
    interfacially polymerizing a polycarbonate to form a product mixture; wherein the product mixture comprises an aqueous phase and an organic phase comprising an organic solvent, the polycarbonate, a catalyst, and ions;
    separating the aqueous phase and the organic phase while subjecting the product mixture to a shear rate of less than 150,000 $S^{-1}$ to form a separated organic phase and a separated aqueous phase;
    extracting the catalyst from the separated organic phase with an acid stream while subjecting the separated organic phase and the acid stream to a shear rate of less than 150,000 $S^{-1}$; and
    extracting the ions from the separated organic phase with a water stream while subjecting the separated organic phase and the water stream to a shear rate of less than 150,000 $S^{-1}$;
    forming a purified organic phase comprising the purified polycarbonate.

3. The process of claim 1, wherein one or more of the separating, the extracting of the catalyst, and the extracting of the ions, is at a shear rate of 0.5 to less than 100,000 $S^{-1}$.

4. A process of purifying an interfacially polymerized polycarbonate from a feed comprising an aqueous phase and an organic phase comprising an organic solvent, the interfacially polymerized polycarbonate, a catalyst, and ions, the process comprising:
    separating the aqueous phase and the organic phase from the feed, wherein during the separating the feed is subjected to at least one of:
    energy of less than or equal to 0.5 kJ/kg of feed,
    a shear rate of less than 150,000 $S^{-1}$, and
    centrifugal forces of 100 to 2,000 g-force,
    to form a purified aqueous phase and a purified organic phase comprising a purified polycarbonate.

5. The process of claim 4, further comprising interfacially polymerizing the interfacially polymerized polycarbonate.

6. The process of claim 4, wherein the feed comprises an organic wash stream and wherein the process further comprises extracting the organic wash stream with an extracting aqueous stream prior to the separating.

7. The process of claim 4, wherein the feed is subjected to the energy of 0.001 to 0.5 kJ/kg of feed.

8. The process of claim 4, wherein the feed is subjected to the shear rate of 0.5 to less than 100,000 $S^{-1}$.

9. The process of claim 1, wherein the separating is at a shear rate of 0.5 to less than 100,000 $S^{-1}$.

10. The process of claim 1, further comprising increasing a size of an aqueous droplet in the organic phase in a low shear rate coalescer to form a coalesced mixture.

11. The process of claim 1, wherein the separated aqueous stream comprises less than or equal to 10 vol % of the organic phase.

12. The process of claim 1, wherein the separated organic phase has a viscosity of less than or equal to 100 centipoise.

13. The process of claim 1, wherein the separating comprises separating with a low shear centrifuge, wherein the low shear centrifuge is free of a rotating disc and a rotating screw, wherein the process further comprises introducing the feed to an annular mixing zone in the low shear centrifuge.

14. The process of claim 1, further comprising determining that the product mixture emulsifies at shear rate of greater than or equal to 150,000 $S^{-1}$ prior to the separating.

15. The process of claim 1, further comprising determining that one or both of the separated aqueous phase and the separated organic phase emulsifies at shear rate greater than or equal to 150,000 $S^{-1}$.

16. The process of claim 2, wherein one or more of the separating, the extracting of the catalyst, and the extracting of the ions, is at a shear rate of 0.5 to less than 100,000 $S^{-1}$.

17. The process of claim 4, further comprising increasing a size of an aqueous droplet in the organic phase in a low shear rate coalescer to form a coalesced mixture.

18. The process of claim 4, wherein the separated aqueous stream comprises less than or equal to 10 vol % of the organic phase.

19. The process of claim 4, wherein the separated organic phase has a viscosity of less than or equal to 100 centipoise.

20. The process of claim 4, further comprising determining that the product mixture emulsifies at shear rate of greater than or equal to 150,000 $S^{-1}$ prior to the separating.

* * * * *